(12) United States Patent
Gantman et al.

(10) Patent No.: US 8,290,162 B2
(45) Date of Patent: *Oct. 16, 2012

(54) COMBINATIONAL COMBINER CRYPTOGRAPHIC METHOD AND APPARATUS

(75) Inventors: Alexander Gantman, Poway, CA (US); Gregory G. Rose, San Diego, CA (US); Jae-Hee Choi, San Diego, CA (US); John W. Noerenberg, II, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1139 days.

This patent is subject to a terminal disclaimer.

(21) Appl. No.: 11/611,827

(22) Filed: Dec. 15, 2006

(65) Prior Publication Data

US 2010/0034385 A1  Feb. 11, 2010

(51) Int. Cl.
  *H04L 9/00* (2006.01)
(52) U.S. Cl. .......................... 380/257; 380/28
(58) Field of Classification Search .................. None
  See application file for complete search history.

(56) References Cited

U.S. PATENT DOCUMENTS

| | | | |
|---|---|---|---|
| 4,870,683 A | 9/1989 | Atalla | |
| 4,979,832 A | 12/1990 | Ritter | |
| 5,301,223 A * | 4/1994 | Amadon et al. | 455/409 |
| 5,455,861 A | 10/1995 | Faucher et al. | |
| 5,583,933 A * | 12/1996 | Mark | 379/357.04 |
| 6,075,859 A | 6/2000 | Rose | |
| 6,275,573 B1 * | 8/2001 | Naor et al. | 379/194 |
| 6,445,780 B1 * | 9/2002 | Rosset et al. | 379/114.17 |
| 6,700,964 B2 * | 3/2004 | Schmid et al. | 379/189 |
| 6,704,715 B1 | 3/2004 | Rosset et al. | |
| 6,844,939 B1 | 1/2005 | Kim et al. | |
| 7,003,501 B2 | 2/2006 | Ostroff | |
| 7,512,567 B2 | 3/2009 | Bemmel et al. | |
| 2002/0076044 A1 * | 6/2002 | Pires | 380/37 |
| 2004/0097217 A1 | 5/2004 | McClain | |
| 2005/0150945 A1 | 7/2005 | Choi | |
| 2008/0046988 A1 | 2/2008 | Baharis et al. | |
| 2008/0144787 A1 | 6/2008 | Gantman et al. | |

FOREIGN PATENT DOCUMENTS

| | | |
|---|---|---|
| DE | 4325459 | 2/1995 |
| JP | 4034053 A | 2/1992 |
| JP | 434053 U | 3/1992 |
| JP | 7177128 A | 7/1995 |

(Continued)

OTHER PUBLICATIONS

International Search Report—PCT/US2007/087526, International Search Authority—European Patent Office—Jul. 1, 2008.

(Continued)

*Primary Examiner* — Gilberto Barron, Jr.
*Assistant Examiner* — Shaun Gregory
(74) *Attorney, Agent, or Firm* — Won Tae Kim

(57) ABSTRACT

Another feature provides an efficient encryption method that safeguards the security of encrypted symbols. Each plaintext symbol is encrypted by using a separate pseudorandomly selected translation table. Rather than pre-storing every possible permutation of symbols as translation tables, the translation tables may be efficiently generated on-the-fly based on a pseudorandom number and a symbol shuffling algorithm. A receiving device may similarly generate reverse translation tables on-the-fly to decrypt received encrypted symbols.

47 Claims, 14 Drawing Sheets

FOREIGN PATENT DOCUMENTS

| | | |
|---|---|---|
| JP | 8130536 A | 5/1996 |
| JP | 9114373 A | 5/1997 |
| JP | 10224341 A | 8/1998 |
| JP | 11511629 | 10/1999 |
| KR | 0165050 B1 | 2/1999 |
| KR | 20060044665 A | 5/2006 |
| TW | 200505119 | 2/2005 |
| TW | 200539150 | 2/2005 |
| TW | I265710 | 11/2006 |
| WO | WO9712461 A1 | 4/1997 |
| WO | 2004045134 | 5/2004 |
| WO | WO2006036521 A1 | 4/2006 |

OTHER PUBLICATIONS

Written Opinion—PCT/US2007/087526, International Search Authority—European Patent Office—Jul. 1, 2008.
Taiwan Search Report—TW096148338—TIPO—May 23, 2011.
Masataka Katoh, "Basic Cryptology I," Saiensu-sha Co. Ltd., Sep. 25, 1989, pp. 12-16, 28-34 and 130-138.

* cited by examiner

| Plaintext Symbols | Binary of Plaintext Symbols | Encrypted Symbols | Binary of Encrypted Symbols |
|---|---|---|---|
| 0 | 0000 | 5 | 0101 |
| 1 | 0001 | 9 | 1001 |
| 2 | 0010 | A | 1100 |
| 3 | 0011 | 0 | 0000 |
| 4 | 0100 | # | 1011 |
| 5 | 0101 | 1 | 0001 |
| 6 | 0110 | C | 1110 |
| 7 | 0111 | * | 1010 |
| 8 | 1000 | 7 | 0111 |
| 9 | 1001 | B | 1101 |
| * | 1010 | 4 | 0100 |
| # | 1011 | 6 | 0110 |
| A | 1100 | D | 1111 |
| B | 1101 | 2 | 0001 |
| C | 1110 | 8 | 1000 |
| D | 1111 | 3 | 0011 | ic
COMBINATIONAL COMBINER CRYPTOGRAPHIC METHOD AND APPARATUS

BACKGROUND

1. Field

Various examples relate generally to secure communications and, more particularly, to a method for stream encryption that secures symbols by efficiently generating translation tables.

2. Background

Stream encryption usually proceeds by generating a keystream of pseudorandom numbers and combining them with plaintext symbols to generate an encrypted output or ciphertext. Normally, binary keystream symbols and binary plaintext symbols are combined on a bit-by-bit basis using an Exclusive-OR (XOR) operation, because it is self-inversive. However, rather than performing bit-wise encryption on plaintext symbols, it is sometimes desirable to encrypt a whole plaintext symbol. Thus, XOR operations cannot be used. Typically, a plaintext symbol is added to keystream symbol modulo n to obtain a ciphertext symbol. But an active attacker, knowing the position of a particular symbol may be able to change that symbol by subtracting from the transmitted ciphertext symbol. For instance, a set plaintext digits (0 to 9) may be encrypted by adding each digit to a pseudorandomly generated digit (0 to 9) from a key stream modulo ten (10). However, an attacker knowing that for a particular plaintext digit was a "1" but the output ciphertext digit was a "7", may determine that the keystream digit was a "6" and can then correctly encrypt any other digit of their choosing for that particular symbol position. Because an attacker may determine how the plaintext symbols and keystream symbols are combined, such partial decryption weakens the security of rest of the encrypted information. That is, once the relationship between a ciphertext symbol and a plaintext symbol is discovered, the security of the remaining ciphertext symbols is compromised since that information may allow other ciphertext symbols to be decrypted by an attacker. Additionally, while simple mathematical operations (e.g., addition, subtraction, multiplication, etc.) quickly and efficiently combine a plaintext symbol and a keystream symbol, using more complex mathematical functions may cause noticeable delays in encryption or demand greater processing resources.

SUMMARY

A method operational on an encrypting device is provided for securing data. A plurality of input symbols are obtained by the encrypting device. A pseudorandomly selected translation table is obtained, from a plurality of translation tables defining different symbol-to-symbol permutations, for each of the input symbols to be encrypted. The input symbols are translated into corresponding output symbols using their corresponding translation table for each of the input symbols to individually encrypt each input symbol. The output symbols may be transmitted to a decrypting device.

Additionally, a second pseudorandomly selected translation table may be obtained, from the plurality of translation tables defining different symbol-to-symbol permutations, for each of the input symbols to be encrypted. The output symbols may be translated into corresponding second output symbols using their corresponding second translation table for each of the output symbols to further individually encrypt each input symbol.

In one example, obtaining the pseudorandomly selected translation table for each of the input symbols to be encrypted may include (a) obtaining a pseudorandomly selected first translation table for a first input symbol and (b) obtaining a pseudorandomly selected second translation table for a second input symbol. Translating the input symbols into corresponding output symbols using their corresponding translation table for each of the input symbols may include (a) translating the first input symbol into a first output symbol using the first translation table, and (b) translating the second input symbol into a second output symbol using the second translation table. The plurality of input symbols may be defined by a set of N symbols, where N is a positive integer and a translation table is a permutation of the N symbols.

In another example, obtaining the pseudorandomly selected translation table for each of the input symbols to be encrypted may include (a) obtaining a first pseudorandom number for a first input symbol to be encrypted, and (b) shuffling the set of N symbols to obtain a different permutation of the set of N symbols and using that permutation as the translation table for the first input symbol.

In one configuration, the first pseudorandom number may be obtained by (a) generating a pseudorandom number for the first input symbol, where the pseudorandom number is k bits long and k is a positive integer, (b) determining whether the pseudorandom number is within a maximum number Pmax, where Pmax is the largest multiple of N factorial that is less than a maximum threshold $2^k$, (c) discarding the pseudorandom number if it is greater than the maximum number Pmax, (d) obtaining different pseudorandom numbers for the first input symbol until an acceptable pseudorandom number is obtained that is less than or equal to the maximum number Pmax, and/or (e) dividing the acceptable pseudorandom number modulo N factorial to obtain the first pseudorandom number. Shuffling the set of N symbols may include (a) initializing a permutation vector P with all symbols of the set of N symbols, and (b) shuffling the symbols in the permutation vector based on the first pseudorandom number.

An encryption device is also provided comprising an input interface and a processing circuit. The input interface may serve to receive an input symbol stream. The processing circuit may be configured to (a) obtain a plurality of input symbols from the input interface; (b) obtain a pseudorandomly selected translation table, from a plurality of translation tables defining different symbol-to-symbol permutations, for each of the input symbols to be encrypted; and/or (c) translate the input symbols into corresponding output symbols using their corresponding translation table for each of the input symbols to individually encrypt each input symbol. The encryption device may also include an output interface coupled to the processing circuit for transmitting the output symbols.

The plurality of input symbols may be defined by a set of N symbols, where N is a positive integer and a translation table is a permutation of the N symbols. The encryption device may also include (a) a keystream generator coupled to the processing circuit, the keystream generator configured obtain a first pseudorandom number from the keystream generator for a first input symbol to be encrypted; and/or (b) a translation table generator coupled to the processing circuit, the translation table generator configured to shuffle the set of N symbols to obtain a different permutation of the set of N symbols and using that permutation as the translation table for the first input symbol.

In one example, the processing circuit may be further configured to (a) generate a pseudorandom number for the first input symbol, wherein the pseudorandom number is k bits long and k is a positive integer; (b) determine whether the pseudorandom number is within a maximum number Pmax, where Pmax is the largest multiple of N factorial that is less than a maximum threshold $2^k$; (c) discard the pseudorandom number if it is greater than the maximum number Pmax; (d) obtain different pseudorandom numbers for the first input symbol until an acceptable pseudorandom number is obtained that is less than or equal to the maximum number Pmax; and/or (e) divide the acceptable pseudorandom number modulo N factorial to obtain the first pseudorandom number.

In one configuration, the processing circuit of the encryption device may also be configured to (a) obtain a second pseudorandomly selected translation table, from the plurality of translation tables defining different symbol-to-symbol permutations, for each of the input symbols to be encrypted; and/or (b) translate the output symbols into corresponding second output symbols using their corresponding second translation table for each of the output symbols to further individually encrypt each input symbol.

Consequently, an encryption device is provided, comprising: (a) means for obtaining a plurality of input symbols; (b) means for obtaining a pseudorandomly selected translation table, from a plurality of translation tables defining different symbol-to-symbol permutations, for each of the input symbols to be encrypted; (c) means for translating the input symbols into corresponding output symbols using their corresponding translation table for each of the input symbols to individually encrypt each input symbol; and/or (d) means for transmitting the output symbols to a decrypting device. The encryption device may also include (a) means for obtaining a second pseudorandomly selected translation table, from the plurality of translation tables defining different symbol-to-symbol permutations, for each of the input symbols to be encrypted; and/or (b) means for translating the output symbols into corresponding second output symbols using their corresponding second translation table for each of the output symbols to further individually encrypt each input symbol.

In one configuration, the encryption device may include (a) means for obtaining a pseudorandomly selected first translation table for a first input symbol; (b) means for obtaining a pseudorandomly selected second translation table for a second input symbol; (c) means for translating the first input symbol into a first output symbol using the first translation table; and/or (d) means for translating the second input symbol into a second output symbol using the second translation table.

In one example, the encryption device may also include (a) means for obtaining a first pseudorandom number for a first input symbol to be encrypted; and/or (b) means for shuffling the set of N symbols to obtain a different permutation of the set of N symbols and using that permutation as the translation table for the first input symbol.

A machine-readable medium is also provided having one or more instructions operational for encrypting symbols, which when executed by a processor causes the processor to: (a) obtain a plurality of input symbols; (b) obtain a pseudorandomly selected translation table, from a plurality of translation tables defining different symbol-to-symbol permutations, for each of the input symbols to be encrypted; and/or (c) translate the input symbols into corresponding output symbols using their corresponding translation table for each of the input symbols to individually encrypt each input symbol. The plurality of input symbols may be defined by a set of N symbols, where N is a positive integer and a translation table is a permutation of the N symbols.

The machine-readable medium may also include one or more instructions which when executed by a processor causes the processor to further: (a) obtain a first pseudorandom number for a first input symbol to be encrypted; and/or (b) shuffle the set of N symbols to obtain a different permutation of the set of N symbols and using that permutation as the translation table for the first input symbol.

In one configuration, the machine-readable medium may also include one or more instructions which when executed by a processor causes the processor to further: (a) generate a pseudorandom number for the first input symbol, wherein the pseudorandom number is k bits long and k is a positive integer, (b) determine whether the pseudorandom number is within a maximum number Pmax, where Pmax is the largest multiple of N factorial mat is less than a maximum threshold $2^k$; (c) discard the pseudorandom number if it is greater than the maximum number Pmax; (d) obtain different pseudorandom numbers for the first input symbol until an acceptable pseudorandom number is obtained that is less than or equal to the maximum number Pmax; and/or (e) divide the acceptable pseudorandom number modulo N factorial to obtain the first pseudorandom number.

A method for decrypting symbols is also provided. A plurality of input symbols defined within a set of n symbols is obtained. A pseudorandomly selected reverse translation table is selected, from a plurality of reverse translation tables defining different symbol-to-symbol permutations, for each of the input symbols to be decrypted. The input symbols are then translated into corresponding output symbols using their corresponding reverse translation table for each of the input symbols to individually decrypt each input symbol. The plurality of input symbols may be defined by a set of N symbols, where N is a positive integer and a reverse translation table is a permutation of the N symbols. The method may further include (a) obtaining a first pseudorandom number for a first input symbol to be decrypted; and/or (b) shuffling the set of N symbols to obtain a different permutation of the set of N symbols and using that permutation as the reverse translation table for the first input symbol.

In one example the first pseudorandom number may be obtained by (a) generating a pseudorandom number for the first input symbol, wherein the pseudorandom number is k bits long and k is a positive integer; (b) determining whether the pseudorandom number is within a maximum number Pmax, where Pmax is the largest multiple of N factorial that is less than a maximum threshold $2^k$; (c) discarding the pseudorandom number if it is greater than the maximum number Pmax; (d) obtaining different pseudorandom numbers for the first input symbol until an acceptable pseudorandom number is obtained that is less than or equal to the maximum number Pmax; and/or (e) dividing the acceptable pseudorandom number modulo N factorial to obtain the first pseudorandom number.

In another configuration, the method may farther include (a) obtaining a second pseudorandomly selected reverse translation table, from the plurality of reverse translation tables defining different symbol-to-symbol permutations, for each of the input symbols to be decrypted; and/or (b) translating the output symbols into corresponding second output symbols using their corresponding second reverse translation table for each of the output symbols to further individually decrypt each input symbol.

A decryption device is provided comprising an input interface and a processing circuit. The input interface may receive an input symbol stream. The processing circuit may be configured to (a) obtain a plurality of input symbols defined within a set of n symbols; (b) obtain a pseudorandomly selected reverse translation table, from a plurality of reverse translation tables defining different symbol-to-symbol permutations, for each of the input symbols to be decrypted; and/or (c) translate the input symbols into corresponding output symbols using their corresponding reverse translation table for each of the input symbols to individually decrypt each input symbol.

The plurality of input symbols may be defined by a set of N symbols, where N is a positive integer and a reverse translation table is a permutation of fee N symbols. The decryption device may also include (a) a keystream generator coupled to the processing circuit, the keystream generator configured obtain a first pseudorandom number from the keystream generator for a first input symbol to be decrypted; and/or (b) a reverse translation table generator coupled to the processing circuit, the reverse translation table generator configured to shuffle the set of N symbols to obtain a different permutation of the set of N symbols and using that permutation as the reverse translation table for the first input symbol.

The plurality of input symbols may be defined by a set of N symbols, where N is a positive integer and a reverse translation table is a permutation of the N symbols. The processing circuit may be further configured to (a) generate a pseudorandom number for the first input symbol, wherein the pseudorandom number is k bits long and k is a positive integer; (b) determine whether the pseudorandom number is within a maximum number Pmax, where Pmax is the largest multiple of N factorial that is less than a maximum threshold $2^k$; (c) discard the pseudorandom number if it is greater than the maximum number Pmax; (d) obtain different pseudorandom numbers for the first input symbol until an acceptable pseudorandom number is obtained that is less than or equal to the maximum number Pmax; and/or (e) divide the acceptable pseudorandom number modulo N factorial to obtain the first pseudorandom number.

In another example, the processing circuit may be further configured to (a) obtain a second pseudorandomly selected reverse translation table, from the plurality of reverse translation tables defining different symbol-to-symbol permutations, for each of the input symbols to be decrypted; and/or (b) translate the output symbols into corresponding second output symbols using their corresponding second reverse translation table for each of the output symbols to further individually decrypt each input symbol.

Consequently, a decryption device is also provided, comprising: (a) means for obtaining a plurality of input symbols defined within a set of n symbols; (b) means for obtaining a pseudorandomly selected reverse translation table, from a plurality of reverse translation tables defining different symbol-to-symbol permutations, for each of the input symbols to be decrypted; and/or (e) means for translating the input symbols into corresponding output symbols using their corresponding reverse translation table for each of the input symbols to individually decrypt each input symbol. The plurality of input symbols may be defined by a set of N symbols, where N is a positive integer and a reverse translation table is a permutation of the N symbols. The decryption device may further include (a) means for obtaining a first pseudorandom number for a first input symbol to be decrypted; and/or (b) means for shuffling the set of N symbols to obtain a different permutation of the set of N symbols and using that permutation as the reverse translation table for the first input symbol. The first pseudorandom number is obtained by (a) means for generating a pseudorandom number for the first input symbol, wherein the pseudorandom number is k bits long and k is a positive integer; (b) means for determining whether the pseudorandom number is within a maximum number Pmax, where Pmax is the largest multiple of N factorial that is less than a maximum threshold $2^k$; (c) means for discarding the pseudorandom number if it is greater than the maximum number Pmax; (d) means for obtaining different pseudorandom numbers for the first input symbol until an acceptable pseudorandom number is obtained that is less than or equal to the maximum number Pmax; and/or (e) means for dividing the acceptable pseudorandom number modulo N factorial to obtain the first pseudorandom number.

A machine-readable medium is also provided having one or more instructions for decrypting symbols, which when executed by a processor causes the processor to: (a) obtain a plurality of input symbols defined within a set of n symbols; (b) obtain a pseudorandomly selected reverse translation table, from a plurality of reverse translation tables defining different symbol-to-symbol permutations, for each of the input symbols to be decrypted; and/or (c) translate the input symbols into corresponding output symbols using their corresponding reverse translation table for each of the input symbols to individually decrypt each input symbol. The plurality of input symbols is defined by a set of N symbols, where N is a positive integer and a reverse translation table is a permutation of the N symbols.

The machine-readable medium may also comprise one or more instructions which when executed by a processor causes the processor to further: (a) obtain a first pseudorandom number for a first input symbol to be decrypted; and/or (b) shuffle the set of N symbols to obtain a different permutation of the set of N symbols and using that permutation as the reverse translation table for the first input symbol.

In another example, the machine-readable medium may also comprise one or more instructions which when executed by a processor causes the processor to further: (a) obtain a second pseudorandomly selected reverse translation table, from the plurality of reverse translation tables defining different symbol-to-symbol permutations, for each of the input symbols to be decrypted; and/or (b) translate the output symbols into corresponding second output symbols using their corresponding second reverse translation table for each of the output symbols to further individually decrypt each input symbol.

DETAILED DESCRIPTION

Figure 1:
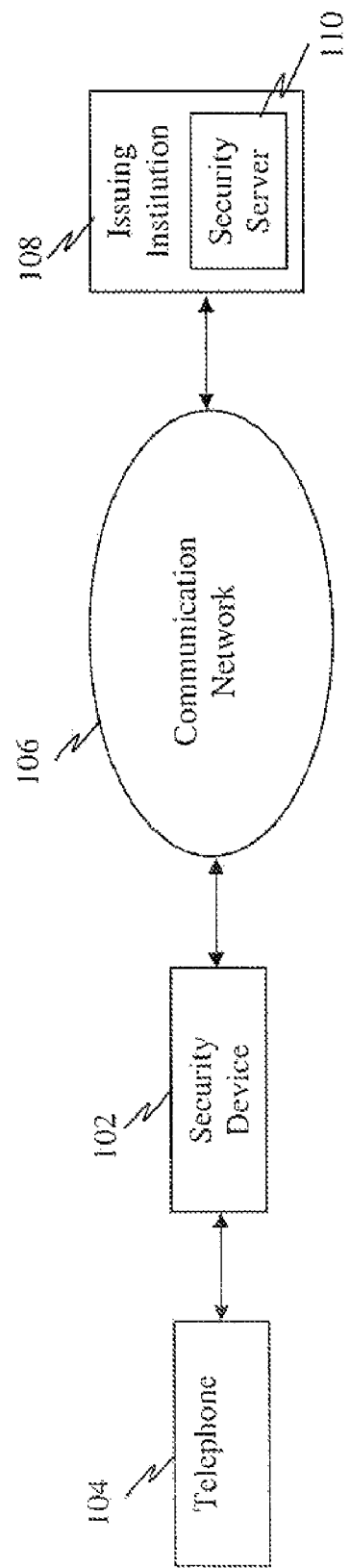
FIG. 1 illustrates a system in which a security device may be coupled along a communication line to a telephone to secure certain communications between the telephone and a secure server.

In the following description, specific details are given to provide a thorough understanding of the examples. However, it will be understood by one of ordinary skill in the art that the examples may be practiced without these specific details. For example, circuits may not be shown in block diagrams in order not to obscure the examples in unnecessary detail.

Also, it is noted that the examples may be described as a process that is depicted as a flowchart, a flow diagram, a structure-diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, various configurations may be implemented by hardware, software, firmware, middleware, microcode, or a combination thereof. When implemented in software, firmware, middleware, or microcode, the program code or code segments to perform the described tasks may be stored in a machine-readable medium such as a storage medium or other storage means. A processor may perform the defined tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message parsing, token passing, and network transmission, among others. The methods disclosed herein may be implemented in hardware, software, or both.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One feature provides a small form-factor security device that may be inserted in series with a customer's phone line, which acts as a second factor in a two-factor authentication scheme and encrypts DTMF tones, thereby preventing disclosure of sensitive information. The device does not interfere with the normal operation of the phone. The device may include a small-form factor enclosure which may also offer a branding opportunity for banks and payment services with which they are associated. The device may be powered from the phone line to which it is coupled. In one configuration, a plurality of such devices may be chained or cascaded along a phone line to provide secure communications with multiple different parties (e.g., banks).

Another feature provides an efficient encryption method that safeguards the security of encrypted symbols. Each plaintext symbol is encrypted by using a separate pseudorandomly selected translation table. Rather than pre-storing every possible permutation of symbols as translation tables, the translation tables may be efficiently generated on-the-fly based on a pseudorandom number and a symbol shuffling algorithm. A receiving device may similarly generate reverse translation tables on-the-fly to decrypt received encrypted symbols.

Securing DTMF Tones

FIG. 1 illustrates a system in which a security device 102 may be coupled along a communication line to a telephone 104 to secure certain communications between the telephone 104 and a secure server 108. The security device 102 may be a small-form factor device that can be connected in-line or in series on a telephone line between a telephone 104 and a communication network 106. The security device 102 may be coupled to the telephone line near or adjacent to a telephone 104.

In one example, the security device 102 may be associated with an account and/or an issuing institution 108 (e.g., bank, credit card company, etc.). For example, a bank may issue such security device 102 to its customers, each security devices being uniquely associated with a customer or a customer's account. The issuing institution 108 may have a security server 110 that facilitates telephonic transactions with customers.

Figure 2:
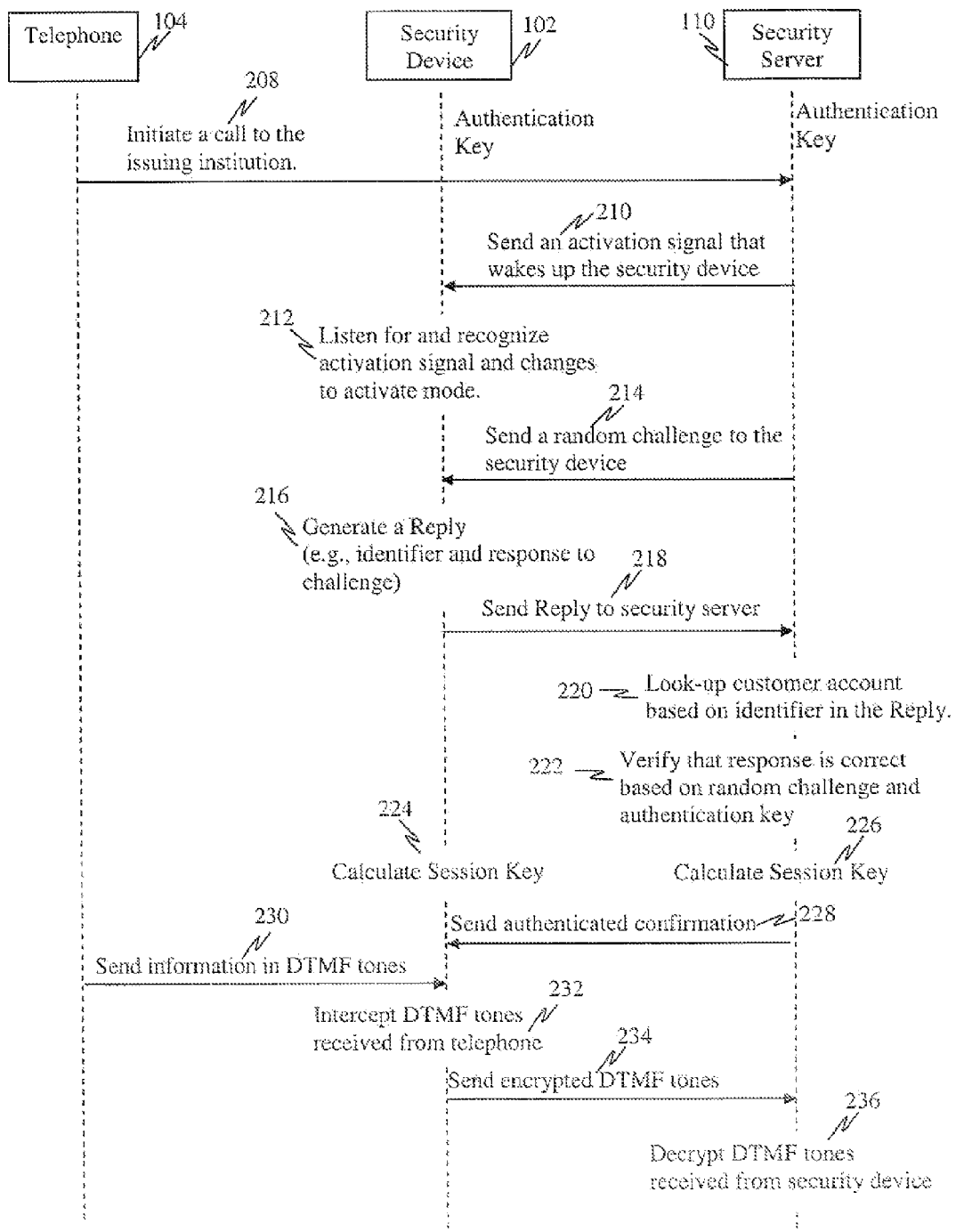
FIG. 2 is a flow diagram illustrating a method for securing certain communications between the telephone and the security server belonging to issuing institution of FIG. 1.

FIG. 2 is a flow diagram illustrating a method for securing certain communications between the telephone 104 and the security server 110 belonging to issuing institution 108 of FIG. 1. The security device 102 may have an active mode of operation and an inactive (passive) mode of operation. When the security device 102 is used to call someone other than the issuing institution 108 (e.g., security server 110), it is inactive and the call just passes through the security device 102, including DTMF tones, unchanged. However, when the telephone 104 initiates a call to the issuing institution 208, the security server 110 (e.g., security server 110) sends an activation signal that wakes up the security device 210. The activation signal may be sufficiently long and/or unique (e.g., have enough digits or symbols) to be reasonably sure that the security device 102 is not likely to be triggered by coincidence. In one example, this activation signal may not actually carry any information but merely triggers or activates the security device 102 to switch from an inactive (passive) mode to active mode. For instance, the activation signal may be a short piece of music or tone that is recognized by the security device 102. The security device 102 listens for and recognizes the activation signal (e.g., a unique set of DTMF tones) from the security server 110 and changes to active mode 212. In one example, upon receiving the activation signal, the security device 102 may start encrypting all DTMF tones from the telephone to the security server 110.

In one configuration, a challenge-response scheme may be implemented between the security device 102 and security server 110. In addition to the activation signal, the security server 110 may send a random challenge to the security device 214. The security device 102 receives the challenge, generates a reply (e.g., identifier and response to challenge) 216, and sends the reply to the security server 110. The reply may include an identifier, associated with the security device 102, and a response to the challenge. The security device 102 may also generate a session key mat may be used to encrypt subsequent DTMF tones from the telephone 104 to the security server 110.

The reply informs the security server 110 that it is communicating with an associated security device. The security server 110 may use the identifier to look-up a particular customer's accounts 220, thereby saving the customer the trouble of identifying themselves manually (e.g., avoids having the customer entering their account number). The security server 110 may also verify that the response is correct based on the random challenge and an authentication key 222, provisioned in both the security device 102 and security server 110, to authenticate the user. Note that since the security device 102 is located in close proximity to the user's telephone (e.g., inside the user's home), an attacker would have to steal it to initiate an attack.

By using the same challenge and response, the security server 110 calculates the same session key 226 as the security device 102 calculates 224. If the security server 110 disagrees with the reply it receives from the security device 102 (or does not receive a response at all), the call may be diverted to an alternative path for more stringent identification and/or authentication. That is, the security device 102 may calculate its response based on the received random challenge and the authentication key. The security server 110 can then verity the received response by calculating a local response (based on the random challenge and authentication key) and compares it to the received response from the security device 102.

If the challenge-response is properly authenticated, the security server 110 sends a confirmation that is authenticated 228 using the newly derived session key. This confirmation informs the security device 102 to start encrypting DTMF tones coming from the telephone 104. If there is a problem with the confirmation from the security server (e.g., it is not received by the security device 102 within a certain maximum time, or the confirmation fails, etc.), the security device 102 may generate a warning signal to the user. For example, a light may flash (or come ON) or an alarm may sound if the challenge-response authentication fails. Additionally, a light (e.g., light emitting diode—LED) may glow to indicate the security device 102 is active and/or the challenge-response is successfully authenticated.

Once the challenge-response is successfully authenticated, in one example the session key may be used by the security device 102 to encrypt transmissions from telephone 104 to the security server. Once encryption begins, the security device intercepts DTMF tones coming from the telephone 232 and transmits encrypted DTMF tones instead 234. In one example of such encryption of DTMF tones, DTMF tones from the telephone 104 may be translated into different DTMF tones which are then sent to the security server 110. In another configuration, DTMF tones may be converted to digital symbols by the security device 102 which are then encrypted and sent to the security server 110. The security device 102 also passes anything else (non-DTMF tones or signals) in both directions without modifying or encrypting it. Since one of the first things the user may be asked is to enter a PIN number associated with their account, the DTMF tones associated with this PIN number is encrypted and may form a second factor for authentication. Similarly, the security server 110 can use the session key to decrypt DTMF tones received from the telephone via the security device 236.

In an alternative configuration, the security device 102 may be configured to recognize a particular telephone number(s) associated with a particular issuing institution 108. When the security device 102 recognizes that the telephone has dialed the particular telephone number, it may automatically switch to active mode and/or encrypt all DTMF tones from the telephone to the security server 110.

The security device 102 may continue to encrypt DTMF tones from the telephone 104 until the call is terminated, at which point the security device 102 switches back to inactive mode where it allows all DTMF tones to pass through unchanged.

Since the security device 102 may have a small form factor and may be easily plugged into a telephone line. A user may have multiple security devices, associated with a single institution or account, to enable the user to securely access an account from different locations (e.g., home, office, etc.). A user may also have multiple security devices associated with various different institutions and/or accounts. These multiple security devices may be coupled in series along a telephone line. An inactive security device in a chain merely passes signals to the next security device in the chain. If a security device in the chain is activated by a security server, then it encrypts DTMF tones from the telephone.

In another example, a security device 102 may serve multiple users from one telephone or location. In such case, the security server may identify that the security device is associated with a plurality of users or accounts. To distinguish between each user, the security server may send a voice prompt requesting the user to enter a PIN or other identifier that identifies a particular user or account.

Figure 3:
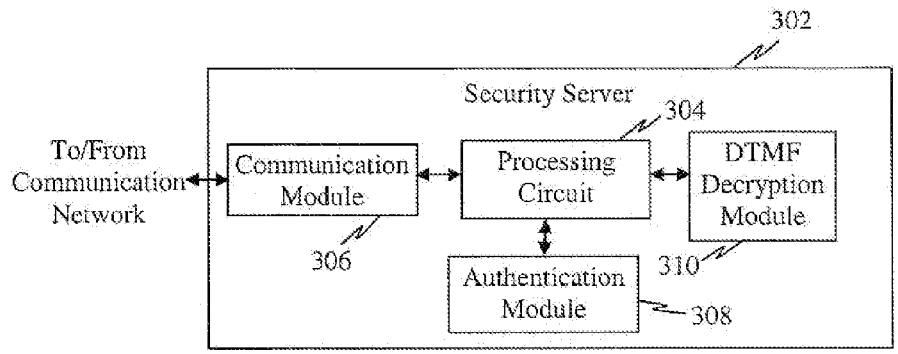
FIG. 3 illustrates a block diagram of one example of a tele-services security server that may enable securing DTMF tones during transmission.

FIG. 3 illustrates a block diagram of one example of a tele-services security server that may enable securing DTMF tones during transmission. The security server 302 may include a processing circuit 304, such as a small and/or low-power microprocessor. The security server 302 may be include a first communication module 306 used to couple the security server 302 to a communication network. An authentication module 308 allows the security server 302 to authenticate a security device with which it communicates. A DTMF decryption module 308 allows the security server 302 to decrypt encrypted DTMF tones received from the security device.

Figure 4:
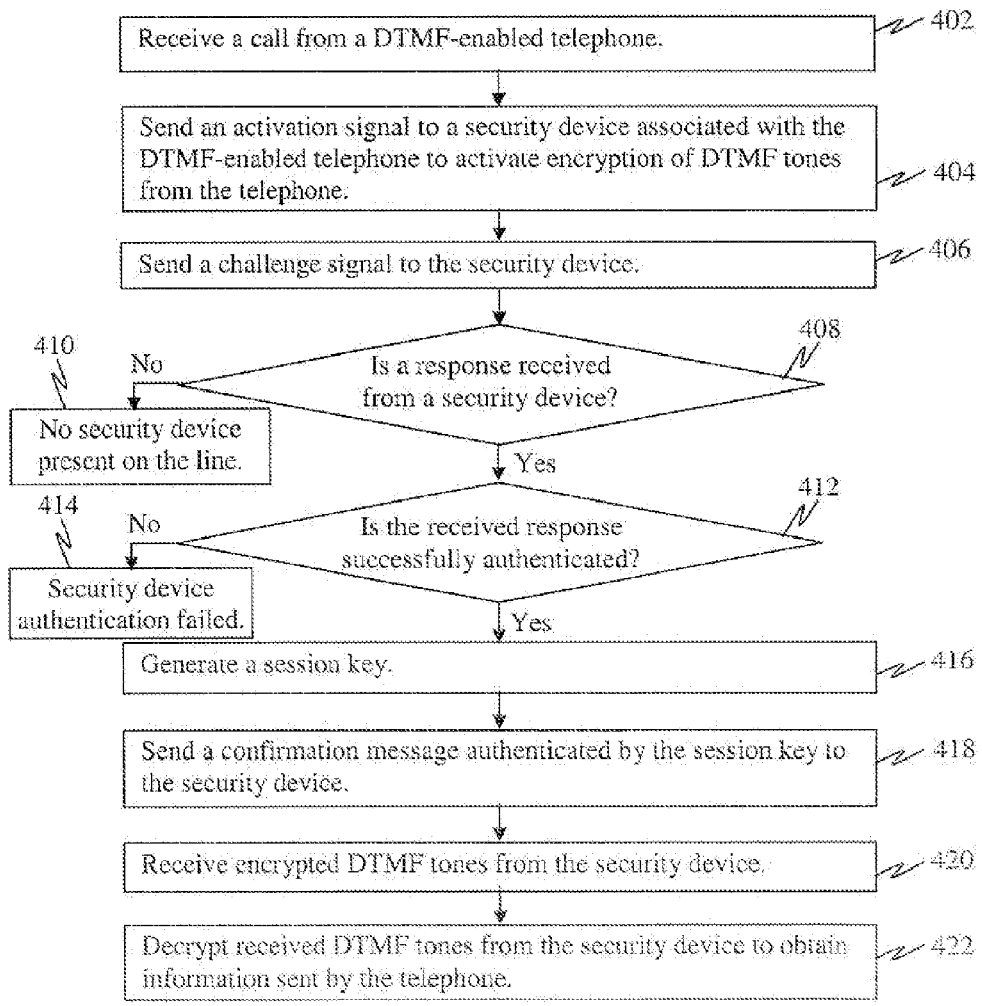
FIG. 4 illustrates a method operational on a security server for securing DTMF tones from a telephone device.

FIG. 4 illustrates a method operational on a security server for securing DTMF tones from a telephone device. A call is received from a DTMF-enabled telephone 402. An activation signal is sent to a security device associated with the DTMF-enabled telephone 404. The security device may be located near in proximity to the DTMF-enabled telephone. The security device is then authenticated by the security server. For instance, a challenge signal is sent to the security device 406. The security server determines whether a response is received from a security device 408. If not, then it may be assumed that no security device is present on the telephone line 410. Otherwise, the security server determines whether the received response can be successfully authenticated 412. If the received response cannot be successfully authenticated, then authentication fails 414. Otherwise, a session key is generated 416. A confirmation message authenticated by the session key is sent to the security device 418. The security server may receive encrypted DTMF tones from the security device 420. The security server may then decrypt the received DTMF tones to obtain information sent by the telephone 422. Such DTMF tones may represent confidential information (e.g., account number, password, PIN, etc.) that is protected from eavesdroppers during transmission by encrypting the original DTMF tones.

Figure 5:
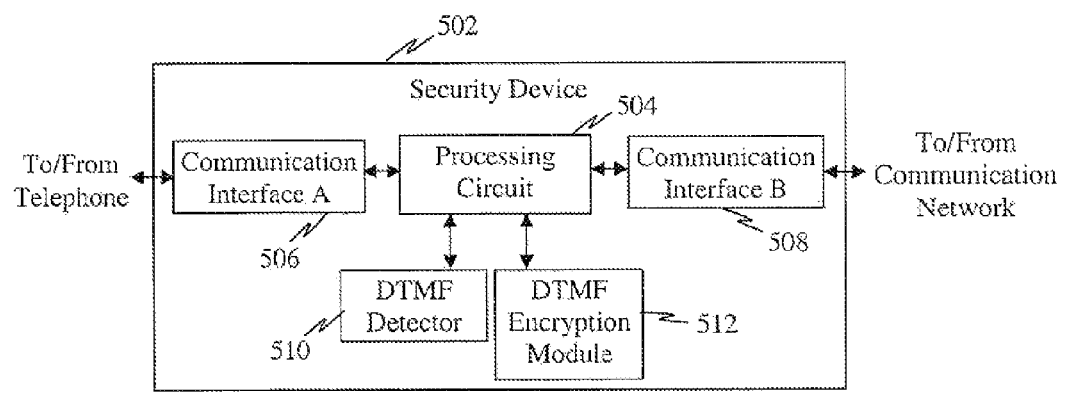
FIG. 5 illustrates a block diagram of one example of a security device that may be configured to protect DTMF tones during transmission.

FIG. 5 illustrates a block diagram of one example of a security device that may be configured to protect DTMF tones during transmission. The security device 502 may include a processing circuit 504, such as a small and/or low-power microprocessor. The security device 502 may be powered by a telephone line to which it is coupled. A first communication interface A 506 may be used to couple the security device 502 to a telephone. A second communication interface B 508 may be used to couple the security device 502 to a communication network. In a passive mode of operation, the security device 502 lets all DTMF tones pass through unchanged. The processing circuit 504 may be configured to listen for an activation signal (e.g., from a security server). A DTMF detector 510 may be configured to detect a DTMF activation signal to switch the security device to an active mode of operation. In active mode, the security device 502 may be configured to respond to an authentication challenge from a security server.

In activation mode, the DTMF detector 510 may also be configured to detect DTMF tones received via communication interface A 506 (e.g., coming from a telephone). If one or more DTMF tones are detected, the DTMF tones are encrypted or otherwise modified by a DTMF encryption module 512. The encrypted DTMF tones are then transmitted through the communication interface B 508 to a security server.

Figure 6:
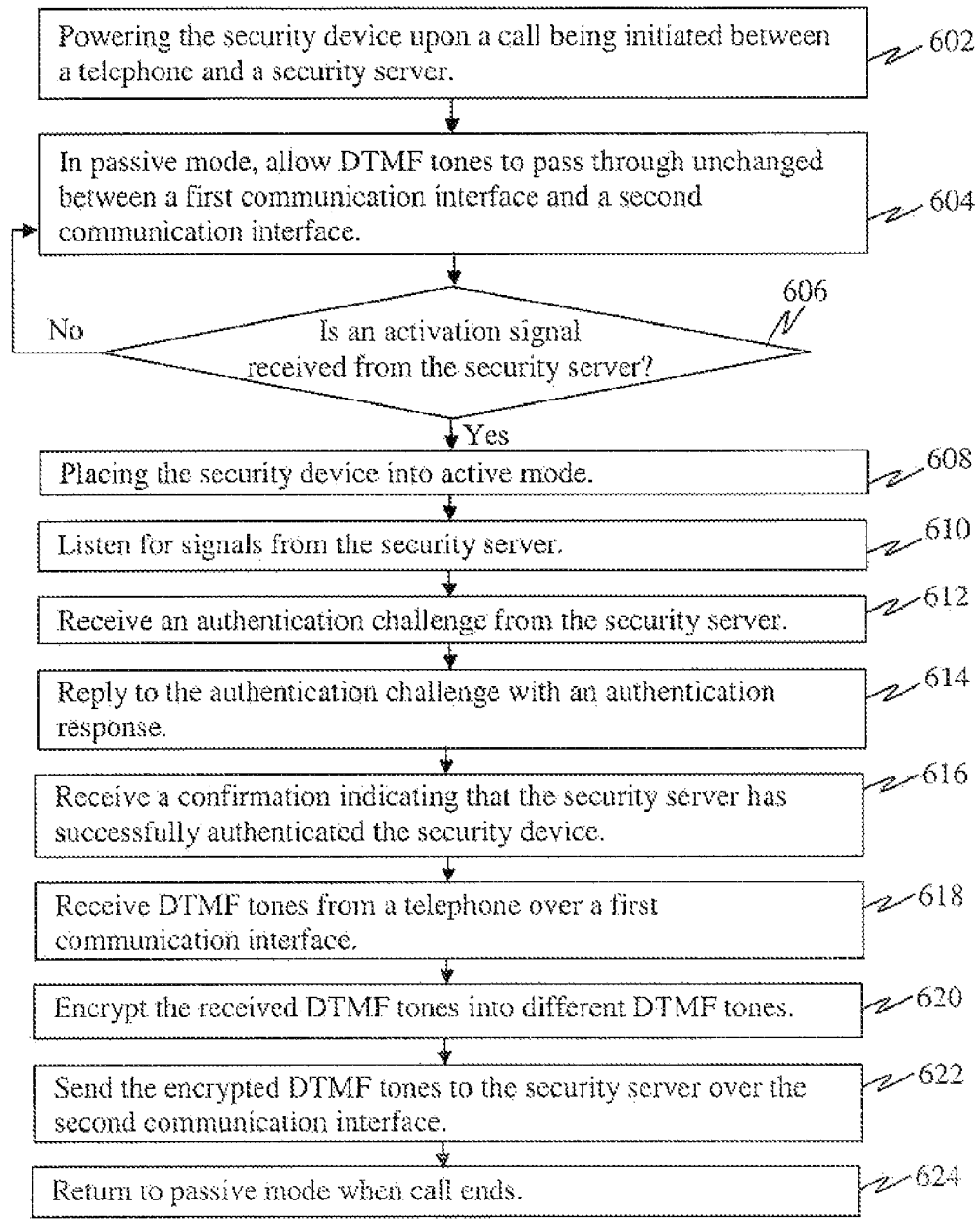
FIG. 6 illustrates a method operational on a security device for securing DTMF tones from a telephone device.

FIG. 6 illustrates a method operational on a security device for securing DTMF tones from a telephone device. The security device is powered upon a call being initiated between a telephone and a security server 602. That is, since the communication line is energized when a call is made, the security device may draw its power from the communication line. In a passive mode of operation, the security device allows DTMF tones to pass through unchanged between a first communication interface and a second communication interface 604. For example, the first communication interface may be coupled to the telephone and the second communication interface may be coupled to a second communication interface. The security device monitors transmissions to determine whether a (DTMF) activation signal is received from a security server 606. The security device continues operating in passive mode unless an activation signal is received. If a DTMF activation signal is received, the security device changes to an active mode of operation 608. The security device may also listen for other signals from the security server 610.

The security device may receive a challenge from the security server 612. The security device replies with a response to the challenge 614. If the response is valid, the security device may receive a confirmation indicating that the security server has successfully authenticated the security device 616.

Once activated and properly authenticated, the security device listens for DTMF tones from the telephone. If DTMF tones are received from the telephone (to which the security device is coupled) over the first communication interface 618, the received DTMF tones are encrypted into different DTMF tones 620. In one example, DTMF tones from the telephone may be translated into different DTMF tones which are then sent to the security server. In another configuration, DTMF tones may be converted to digital symbols by the security device 102 which are then encrypted and sent to the security server. The encrypted DTMF tones are then sent to the security server over the second communication interface 622. The security device continues to encrypt DTMF tones from the telephone until the call ends, at which time the security device returns to passive mode 624. The security device 102 prevents unencrypted DTMF tones from the telephone from passing to the security server. In one example, the security device 102 may disconnect all inputs (e.g., transmissions) from the telephone the network while active. In this ease there may be some provision for either the customer or the security server to reconnect the inputs (e.g., allow transmissions from the security device 102), for example, if the customer needs to talk to a representative.

Cellular Phone Security Scheme

Figure 7:
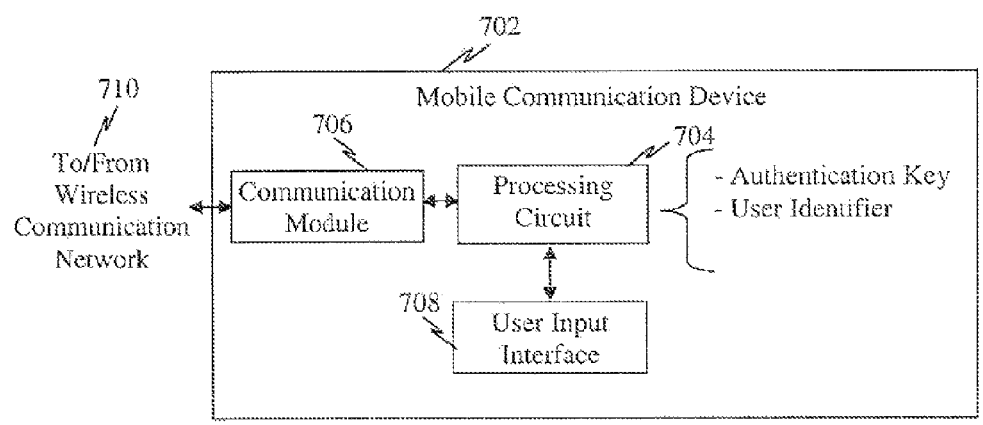
FIG. 7 is a block diagram of a mobile communication device configured to authenticate itself with a security server.

FIG. 7 is a block diagram of a mobile communication device configured to authenticate itself with a security server. The mobile communication device 702 includes a processing circuit 704 coupled to a communication module 706 and a user input interface 708. The communication module 706 enables the mobile communication device 702 to communicate over a wireless communication network 710. The processing circuit 704 may be configured to authenticate itself with one or more security servers during a call. For example, the mobile communication device may be configured with an authentication key and/or a user identifier that allows a bank or financial institution to authenticate the user of the mobile communication device 702. The authentication key and/or user identifier may be provided beforehand (e.g., during setup or configuration) by the bank or financial institution. Additionally, the processing circuit 704 may also request a PIN, password, and/or other input from a user to complete an authentication procedure.

Figure 8:
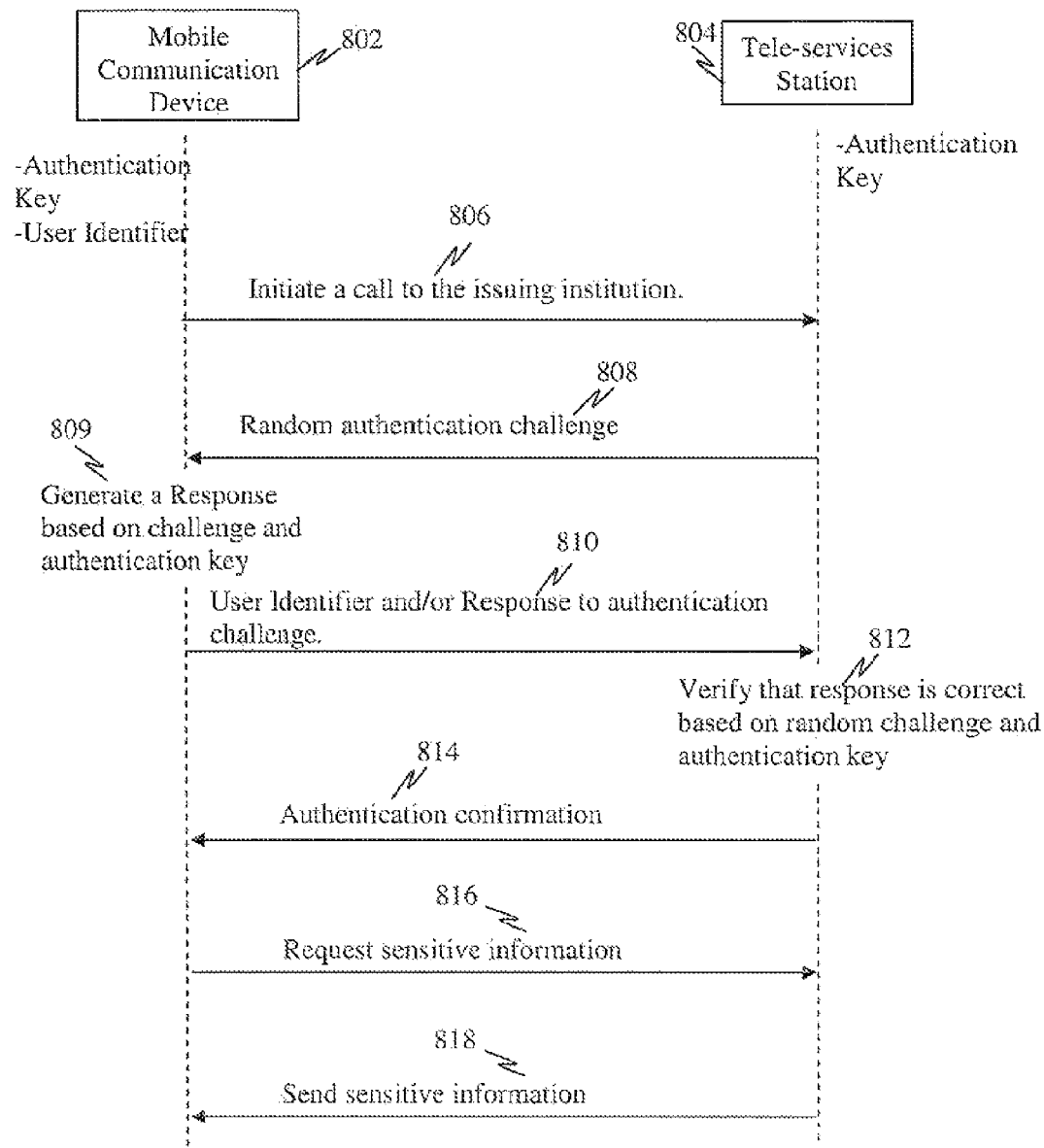
FIG. 8 is a flow diagram illustrating a method for authenticating a mobile communication device to a tele-services station over a communication network.

FIG. 8 is a flow diagram illustrating a method for authenticating a mobile communication device 802 to a tele-services station 804 over a communication network. The mobile communication device 802 may be a mobile phone and the tele-services station 804 may include a security server associated with a banking or financial institution. The mobile communication device 802 and tele-services station 804 may each have the same authentication key.

The mobile communication device may initiate a call to an issuing institution 806 associated with the tele-services station. The issuing institution may be a bank or financial institution, for example. The tele-services station sends a random authentication challenge 808 to the mobile communication device. The mobile communication device then generates a response based on the random challenge and the authentication key 809 and sends the response and (possibly) a user identifier to the tele-services station 810. The tele-services station then verifies whether the response from the mobile communication device is correct 812. This may be done by the tele-services station calculating a verification value based on its authentication key and the random authentication challenge and comparing it to the response received from the mobile communication device. If the response is successfully authenticated, an authentication confirmation 814 may be sent to the mobile communication device. The mobile communication device may request sensitive information (e.g., bank account records, etc.) from the tele-services station 816. If the mobile communication device is successfully authenticated, the tele-services station then provides the requested sensitive information to the mobile communication device 818. In this manner, a mobile communication device (e.g., mobile phone) may be authenticated by a tele-services station to secure the transmission of sensitive information during a call.

Threat Models

One type of threat addressed by the security device and/or methods described herein is an eavesdropping attack. In such an attack, an attacker may attach a recorder to the telephone wires to listen to the DTMF tones associated with numbers entered by a user on the telephone. These DTMF tones may identify the bank being called, the user's customer and/or account numbers, private identification number (PIN), social security number, among other private and/or confidential information. The attacker may then use this information to perform fraudulent transactions from the user's account. The security device described herein defeats such an attack by encrypting the DTMF tones and providing further authentication. Since most institutions (e.g., banks, etc.) can use two factors for authentication (e.g., possession of the security device and knowledge of a PIN), it would rarely have to ask for other sensitive information. Simply intercepting the encrypted DTMF tones reveals nothing about the corresponding account numbers, PINs, etc.

An attacker, to be successful would have to interfere with the progress of the call by, for example, preventing the call from going to the intended receiver (e.g., intended bank), pretend to the intending receiver, asking the caller to enter all sensitive information. To defeat such attack, the security device may turn On a security indicator (e.g., light) after a "start encrypting" signal (i.e., authenticated confirmation) is received from the receiving institution. The caller (e.g., customer) merely checks the security indicator to make sure that the security device is encrypting its tones before entering any sensitive or confidential information.

Another type of attack may be a session hijacking attack where the attacker waits until the user has established communications with the intended receiver (e.g., bank), thus activating the security indicator, and then takes over the call. The attacker may then pretend that something went wrong with the call and ask the user to verbally provide sensitive information. Alternatively, the attacker may ask the user to enter specific responses (that are already known to the attacker) to try to establish a tone-by-tone encryption pattern, and then use the tone-by-tone conversions to encrypt their own response to the bank. To address this type of attack, the tone-by-tone encryption may be altered or modified on a pseudorandom basis, rotational basis, and/or other basis that inhibits discovery of a number-to-tone relationship.

Message and Session Authentication

The security device may be configured to perform message authentication and session key derivation by using, for example, a Message Authentication Code (MAC) function. For example, a security server may authenticate a caller's security device by splitting the output from a single invocation of $MAC_K$ (Challenge). For instance, a typical MAC function may return 128 bits of output, which may be represented as 32 DTMF tones. After the security server and security device have calculated the MAC, the security server may send the first 16 DTMF tones (representing part of the MAC) to the security device, and, in response, the security device sends back the other 16 DTMF tones (representing the other part of the MAC). In this manner, both the security server and security device may prove to each other that they are authorized or legitimate.

Similarly, a session key may be calculated by each side such that Session Key=$MAC_K$ (Authentication Key||Challenge)), where the authentication key is pre-loaded into the security device. In order to prevent the session key from being discloses when the security device sends its response to the security server, the response may include additional information. For example, the response may be Response=$MAC_K$ ("extra information string"||Authentication Key||Challenge).

Stream Encryption

Another feature provides an efficient cryptographic method that safeguards the security of encrypted symbols. Each plaintext symbol is encrypted by using a separate pseudorandomly selected translation table. Rather than pre-storing every possible permutation of symbols as translation tables, the translation tables may be efficiently generated on-the-fly based on a pseudorandom number and a symbol shuffling algorithm. A receiving device may similarly generate reverse translation tables on-the-fly to decrypt received encrypted symbols.

This cryptographic method may be implemented in various configurations. For example, a telephone security device may convert DTMF tones into digital values, encrypt the digital values by using a pseudorandomly selected translation table for each digital value. The encrypted digital values may then be transmitted to a security server (e.g., tele-services station), either in digital form or as DTMF tones associated with the encrypted digital values.

Because the DTMF tones are represented by (or associated with) digital symbols, they may be secured by, for example, stream encryption. In various examples, stream encryption may use a keystream generated by a block cipher, such as Advanced Encryption Standard (AES) in counter mode, Output Feedback (OFB), or Ciphertext Feedback (CFB) modes. For example, the MAC function may be implemented with a block cipher in CBC-MAC mode. This may be advantageous if, for example, the security device had AES implemented in hardware.

If these functions are implemented in software, it may be preferable to use a dedicated stream cipher such as Non-linear SOBER (NLS). A stream cipher may also be used as a MAC function, albeit with low efficiency, by using the data to be encrypted as a key or nonce input, then generating an output keystream. Since the length of the keystream generated may be as long as desired, both the Response and Session Key may be generated in a single call.

Conventional stream encryption (whether using a true stream cipher or a block cipher in streaming mode) usually proceeds by generating a keystream of pseudo-random numbers and combining them with the plaintext (i.e., digital representations of the DTMF tones) to form an encrypted output or ciphertext. Normally, the keystream and plaintext are combined using an Exclusive-OR (XOR) operation, because it is self-inversive. However, a conventional DTMF-enabled telephone has ten or more keys, each key having a unique tone. Thus, XOR operations cannot be used to encrypt said DTMF tones with a keystream. Instead, the DTMF tones associated with telephone keys may be converted into (or associated with) different digital symbols that may be added to pseudo-random numbers/symbols obtained from the keystream to generate an encrypted symbol or ciphertext. But an active attacker, knowing the position of a particular digit may be able to change that number by subtracting from the transmitted ciphertext number. For instance, an attacker knowing that for a particular DTMF tone the input was a "1" but the output was a "7", may determine that the pseudorandom number generated for this tone was a "6" and can then correctly encrypt any character of their choosing for that particular digit position.

Combinational Combiner

One feature provides for using a keystream to obtain or generate a pseudorandomly selected or generated translation table for each plaintext symbol to be encrypted. Instead of taking a pseudorandom number from the keystream and changing the plaintext the same way (e.g., by adding modulo n), one feature provides for translating each plaintext symbol in an input stream by pseudorandomly selecting one of a plurality of translation tables. Translation tables may provide different possible permutations of a set of numbers or symbols. This is herein referred to as a combinational combiner.

Figures 9, 10:
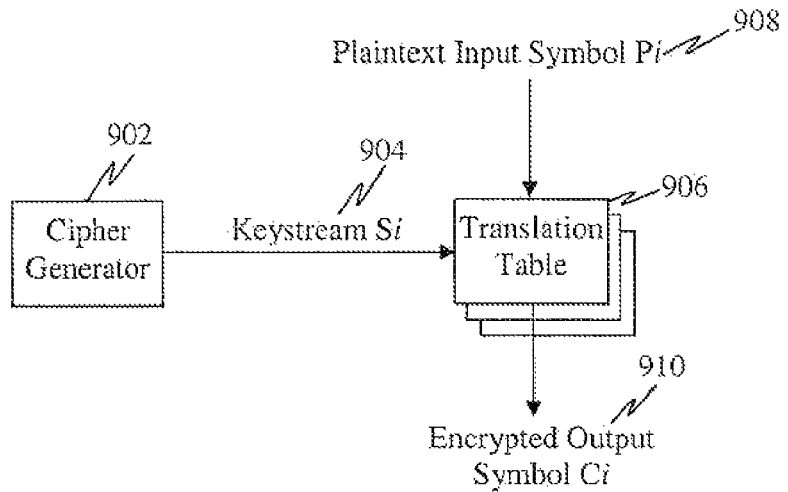
FIG. 9 illustrates a block diagram of a combinational combiner for securing plaintext symbols by pseudorandomly selecting a translation table for each symbol to be encrypted.
FIG. 10 illustrates an example of a symbol-to-symbol translation table for translating a plaintext symbol into an encrypted symbol.

FIG. 9 illustrates a block diagram Of a combinational combiner for securing plaintext symbols by pseudorandomly selecting a translation table for each symbol to be encrypted. A cipher generator 902 is used to generate a keystream Si 904 of pseudorandom numbers/symbols. The pseudorandom numbers of keystream 904 are used to generate or obtain a different translation table 906, from a plurality of possible translation tables, for each plaintext input symbol Pi 908 in an input stream. By translating, the plaintext input symbol 908 into a pseudorandom output, an encrypted output symbol Ci 910 is generated.

Such translation operation defines a permutation of the plaintext input symbols 908 under the control of the keystream 904. The translation table 906 may be represented as a vector of n elements and the translation of a plaintext input symbol 908 may be done by looking up the pth element of the translation table 906. Given an encrypted output symbol Ci, the reverse translation may be done either by creating a table of the inverse permutation, or by searching the table for the entry containing symbol Ci, and returning its index as p.

Generally speaking, for a set of n plaintext symbols, there are n! (factorial) possible permutations. A permutation may be chosen at random from the set of all such permutations, and used as the translation table 906 to translate the plaintext input symbol Pi 908 into the encrypted output symbol Ci 910 (also referred to as ciphertext). For each plaintext symbol in an input stream, a pseudorandomly selected translation table is selected. Then an attacker who sees the encrypted symbol Ci 910 and knows that it corresponds to a particular plaintext symbol still knows nothing about the correspondence between other plaintext symbols and corresponding encrypted symbols. That is, all the information that an attacker can ascertain is that changing the encrypted symbol will yield a different plaintext symbol from the one they know, but not which other plaintext symbol that will be. Thus, the pseudorandomly selected translation tables do not reveal a relationship between the plaintext input symbols and encrypted output symbols (ciphertext) and an attacker cannot exploit the knowledge of any single plaintext symbol to ciphertext symbol translation.

In one example for secure telephone banking, each DTMF tone received by a security device from a telephone is converted to (or associated with) a digital plaintext symbol. The plaintext symbol is then translated by a translation table (obtained based on one or more pseudorandom numbers from the keystream) to obtain an encrypted symbol. The encrypted symbol is then transmitted to a security server (either in digital form or as a DTMF tone corresponding to the encrypted symbol) where it is decrypted by a reverse translation table. The reverse translation table may be generated or obtained by having synchronized cipher generators at both the security device and security server that generate the same keystream. In one example, the cipher generators may be synchronized by using the same seed (e.g., session key, etc.).

In one example, a plurality of translation tables may be pre-generated and/or stored by the security device and/or security server. Rather man generating a new translation table (i.e., a permutation of the input symbols) on-the-fly, the translation tables may be pre-generated and stored. The pseudorandom values/symbols of the keystream 904 may be used to select one of the pre-generated translation tables for each plaintext symbol to be encrypted. The pre-generated translation tables may define every permutation, or a subset of permutations for a set of n plaintext symbols.

In another example, the translation table used may be generated on-the-fly by using the keystream and pseudorandomly shuffling symbols to form the translation table. Note that these solutions are equivalent, in the sense that it there will be n! tables, and the amount of keystream needed to select one of these tables is the same as the amount needed to create such a table by shuffling.

FIG. 10 illustrates an example of a symbol-to-symbol translation table 1002 for translating a plaintext symbol into an encrypted symbol. In this example, sixteen (16) plaintext symbols translate to a different encrypted symbol. The binary representation is shown in this example to merely illustrate that the sixteen plaintext symbols may be encrypted using four-bit encrypted symbols. In other examples, were a greater or fewer number of plaintext symbols are to be encrypted, a different number of bits may be used for each symbol. For example, for up to two hundred fifty-six (256) plaintext symbols, eight (8) bits may be extracted from the keystream to generate each encrypted symbol.

Another feature provides for a one-to-one correspondence between plaintext symbols and encrypted symbols within a particular translation table. That is, no two plaintext symbols convert to the same encrypted symbol within a particular translation table. This allows a decrypting device to accurately decrypt an encrypted symbol into its original plaintext symbol.

At a decrypting device, a symbol-to-symbol reverse translation table may be generated to reverse the symbol-to-symbol translation of an encryption device and thereby decrypt received encrypted symbols.

Figure 11:
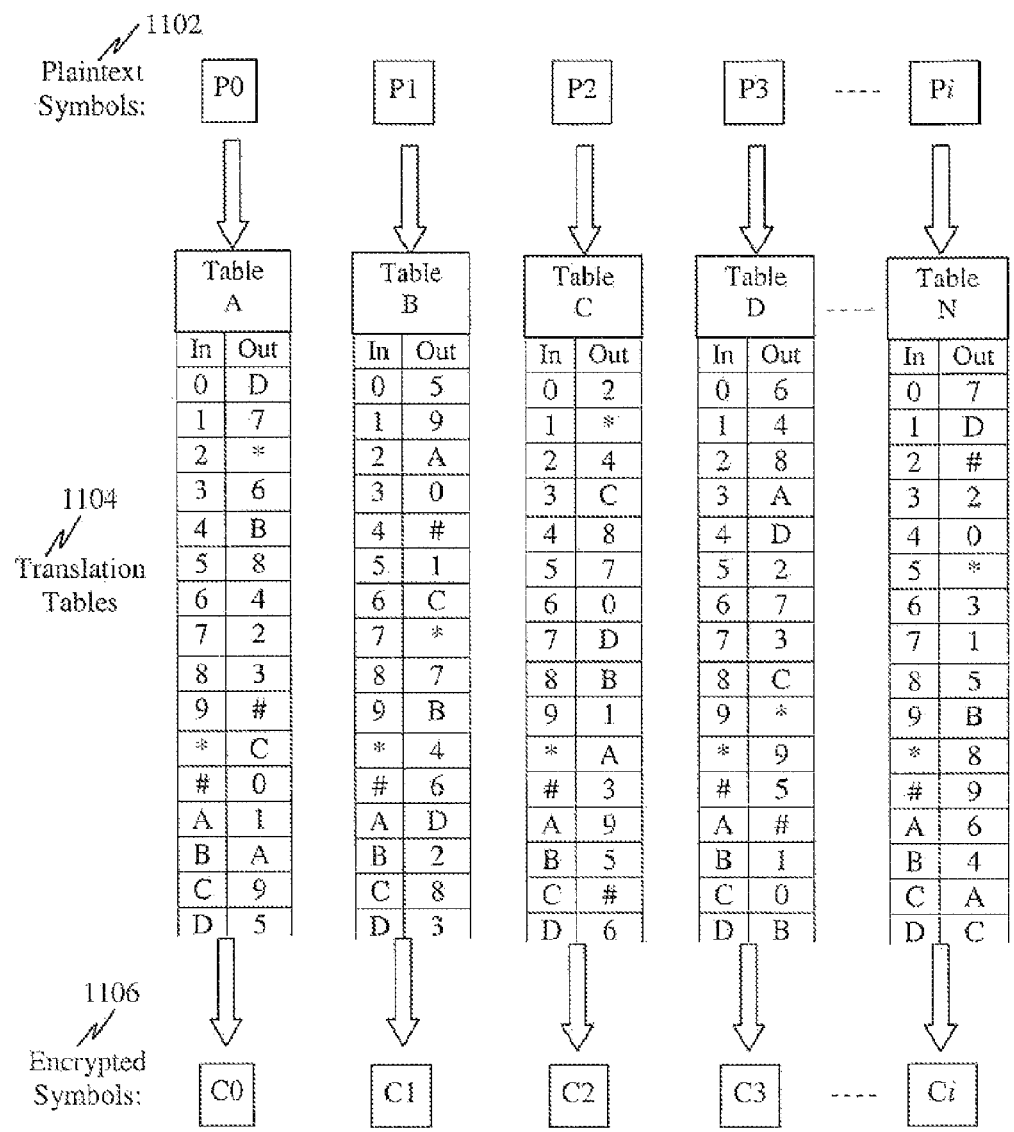
FIG. 11 illustrates one example of how plaintext symbols may be encrypted using different translation tables to obtain encrypted symbols.

FIG. 11 illustrates one example of how plaintext symbols 1102 may be encrypted using different translation tables 1104 to obtain encrypted symbols 1106. For each plaintext symbol P0, P1, P2, P3, . . . Pi different translation tables 1104, each with a different permutation of symbols, is used to obtain encrypted symbols C0, C1, C2, C3, . . . Ci.

For a small number of symbols in a set, it may be possible to list (i.e., pre-generate) all the permutations of such symbols, and use an index (from the keystream) to select a translation table from the permutations. For example, for a set of twelve (12) possible symbols, the number of possible permutations generated is 12! or 479,001,600. To adequately select a permutation, a thirty-two (32) bit keystream may suffice to choose one permutation as a translation table without bias. However, this approach becomes inefficient as the number of symbols in a set increase. For instance, for a set of 256 possible symbols, the number of possible permutations generated is 256! or $8.5 \times 10^{506}$ which would take in excess of 1684 bits from the pseudorandom keystream to select one of the permutations as a translation table.

Figure 12:
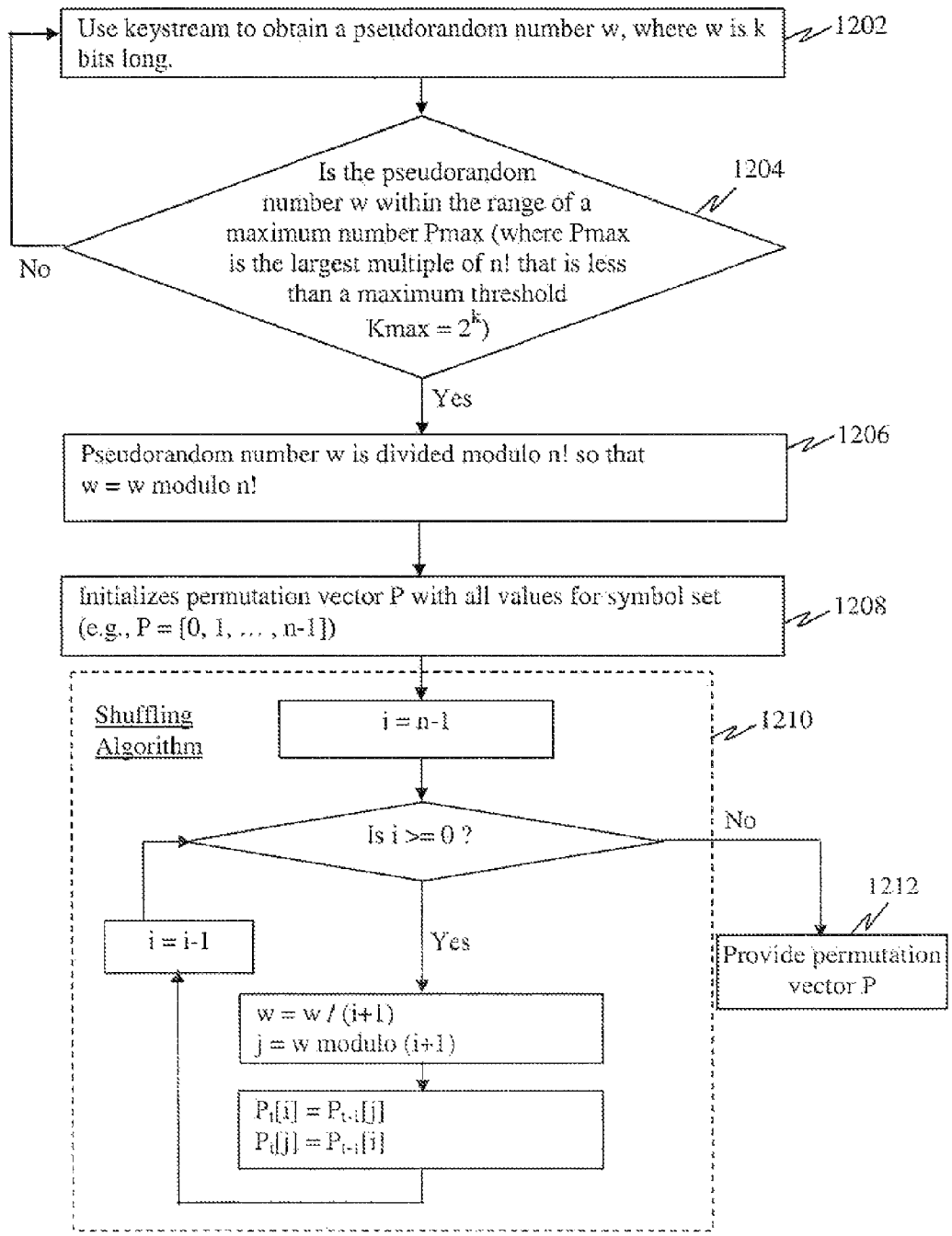
FIG. 12 illustrates an algorithm for selecting a translation table from a plurality of possible permutations for a set of n symbols, where n is a positive integer.

FIG. 12 illustrates an algorithm for selecting a translation table from a plurality of possible permutations for a set of n symbols, where n is a positive integer. In this example, a cipher generator may be used that provides pseudorandom keystream values k bits long (e.g., 8 bits, 32 bits, etc.) uniformly-distributed in the range of 0 and $2^k-1$. The keystream is used to obtain a pseudorandom number w 1202. Since n! may not divide evenly into $2^k$, the pseudorandom number w cannot be used directly without introducing biases. For this reason, a maximum threshold Pmax is defined as the largest multiple of n! that is less than $2^k$. If the pseudorandom number w is less than this maximum threshold Pmax, then it can be used without introducing a bias. Otherwise, if the pseudorandom number w is greater than or equal to this maximum threshold Pmax, it is discarded and a new pseudorandom number w is selected until a pseudorandom number w is obtained that is less than the maximum threshold Pmax 1204.

The pseudorandom number w is divided modulo n! so that w=w modulo (n!) 1206. Thus, an unbiased pseudorandom number w is obtained in the range of 0 to n! that can be used to obtain a permutation (i.e., translation table).

Rather than storing pre-generated permutations and selecting one such permutation by using the pseudorandom number w, one feature provides for generating a permutation by shuffling symbols of a base permutation to generate a translation table. A base permutation vector P is initialized with all values of a symbol set such that P=[0, 1, 2, . . . n−1] 1208. A symbol shuffling algorithm 1210 is then used to shuffle the symbols in the base permutation vector P using pseudorandom number w.

One example of a symbol shuffling algorithm 1210 initializes a counter i to n−1, where n is the number of symbols in a set. While counter i>=0, pseudorandom number w=w/(i+1), a variable j=w modulo (i+1) and the values of permutation vector P are shuffled such that $P_t[i]=P_{t-1}[j]$ and $P_t[j]=P_{t-1}[i]$. Note that other symbol shuffling algorithms may be used without departing from the present disclosed feature.

Once the permutation vector P has been shuffled, it may be provided 1212 to any application that can use it, for example, as a translation table to encrypt an input symbol stream.

Figure 13:
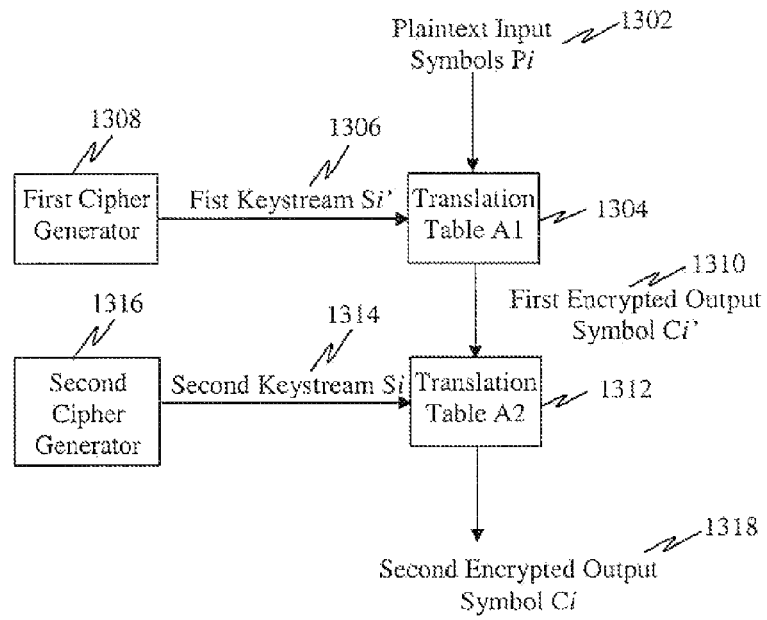
FIG. 13 is a block diagram illustrating another encryption scheme that may achieve symbol authentication by using multiple translation tables to encrypt a single plaintext symbol.

FIG. 13 is a block diagram illustrating another encryption scheme that may achieve symbol authentication by using multiple translation tables to encrypt a single plaintext symbol. That is, a plaintext input symbol Pi 1302 is encrypted by a translation table A1 1304, that may be generated or selected based on a first keystream Si' 1306 obtained from a first cipher generator 1308, to obtain a first encrypted output symbol Ci' 1310. The first encrypted output symbol Ci' 1310 then serves as input to a second translation table A2 1312, that may be generated or selected based on a second keystream Si 1314 obtained from a second cipher generator 1316, used to obtain a second encrypted output symbol Ci 1318. In this manner, redundancy may be used to authenticate the first encrypted output symbol Ci' 1310. That is, by using symbols Ci' 1310 and Ci 1318 together, symbol Ci 1318 authenticates Ci' 1310. Thus, if an attacker succeed in changing symbol Ci' 1310, for example, it would not be properly authenticated by symbol Ci 1318.

Figure 14:
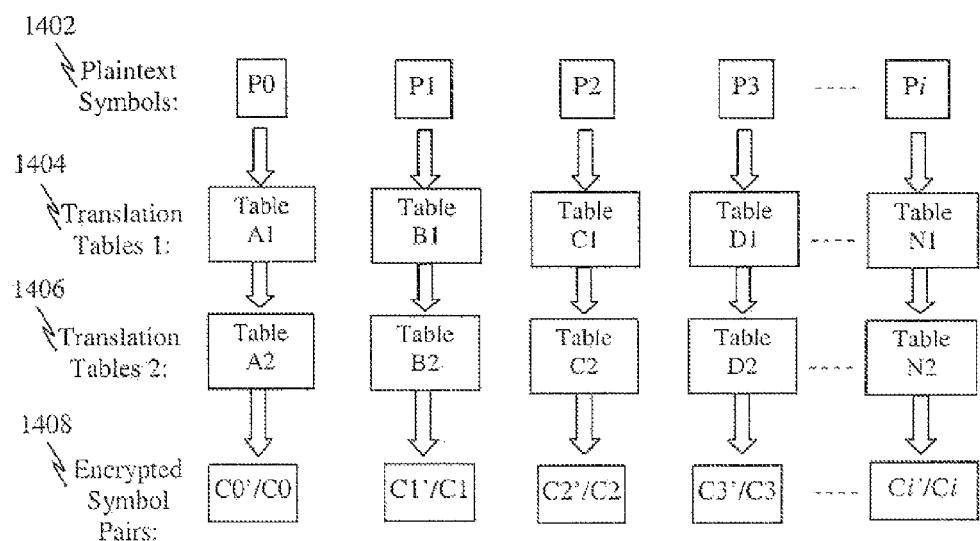
FIG. 14 illustrates how multiple translation tables may be used to encrypt each plaintext symbol to obtain a corresponding encrypted symbol.

FIG. 14 illustrates how multiple translation tables 1404 and 1406 may be used to encrypt each plaintext symbol 1402 to obtain a corresponding pair of encrypted symbols 1408. It should be noted that the translation tables 1404 and 1406 may be pseudorandomly selected and/or generated to encrypt each plaintext symbol Pi into a pair of symbols Ci'/Ci.

Figure 15:
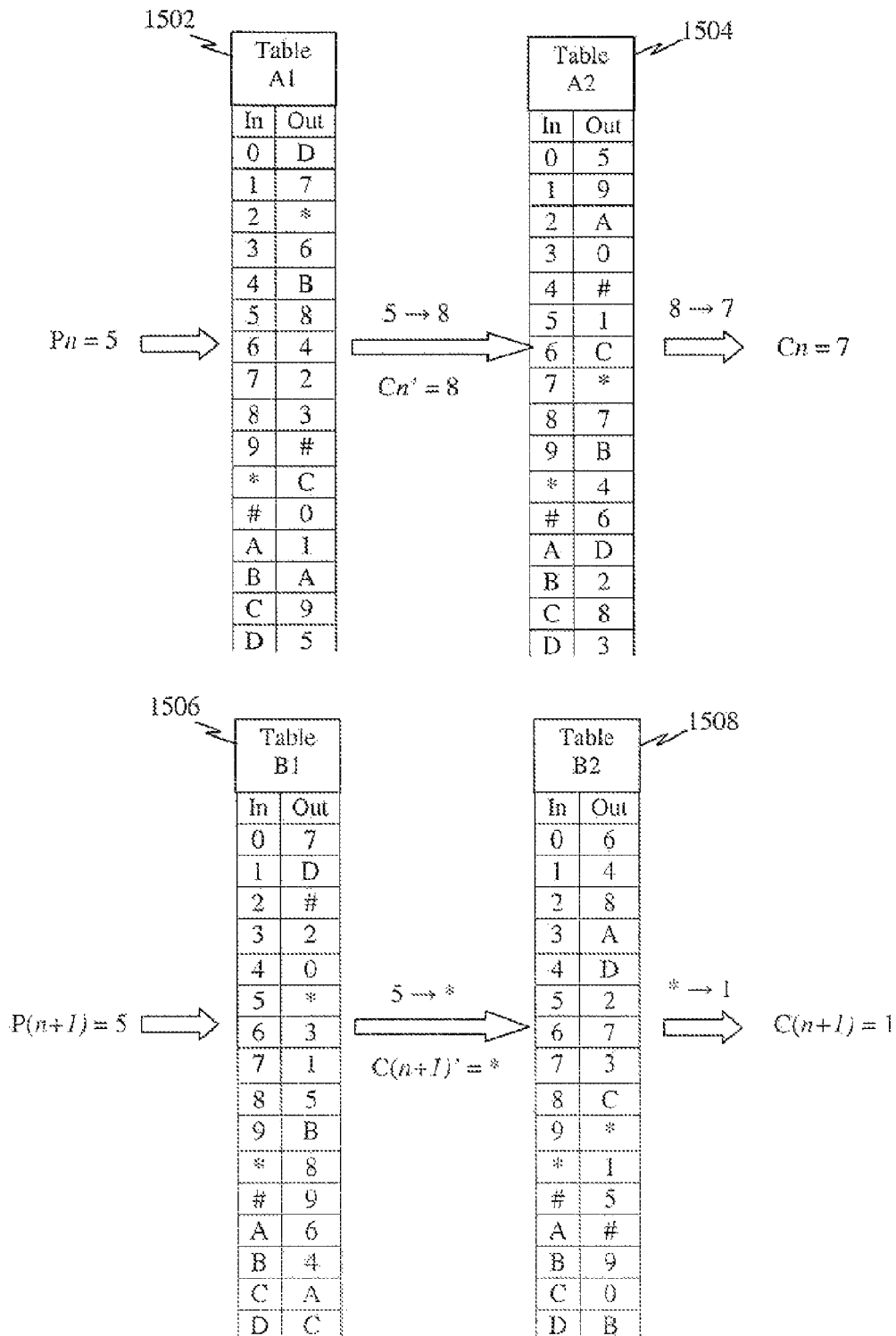
FIG. 15 illustrates an example of how two translation tables may be employed to translate or encrypt a plaintext symbol into an encrypted symbol.

FIG. 15 illustrates an example of how two translation tables may be employed to translate or encrypt a plaintext symbol Pn into a pair of symbols Cn' and Cn. For example, for a first plaintext symbol Pn='5', a first translation table A1 1502 provides a first output symbol Cn'=8 (i.e., '5' translates to '8'). The first output symbol '8' may then serve as input to a second translation table A2 1504 to obtain a second output symbol Cn=7 (i.e., '8' translates to '7'). Because the second output symbol Cn was generated based on the first output symbol Cn', the redundant symbols Cn and Cn' may be used for authentication. If either or both symbols are changed by an attacker during transmission, then authentication fails. For example, if Cn' is modified from '8' to '4' by an attacker, a recipient who receives symbols Cn' and Cn='47' would discover that Cn='7' should mean that Cn'='8' not '4'.

A second plaintext symbol P(n+1) may have completely different translation tables even where the first plaintext symbol and second plaintext symbol are the same. For example, for a second plaintext symbol P(n+1)='5', a first translation table B1 1506 provides a third output symbol C(n+1)='*' (i.e., '5' translates to '*'). The third output symbol C(n+1)'='*' may then serve as input to a second translation table B2 1508 to obtain a fourth output symbol C(n+1)='1' (i.e., '*' translates to '1'). As before, the redundant use of symbol pair C(n+1)' and C(n+1) may serve as a form of authentication.

Figure 16:
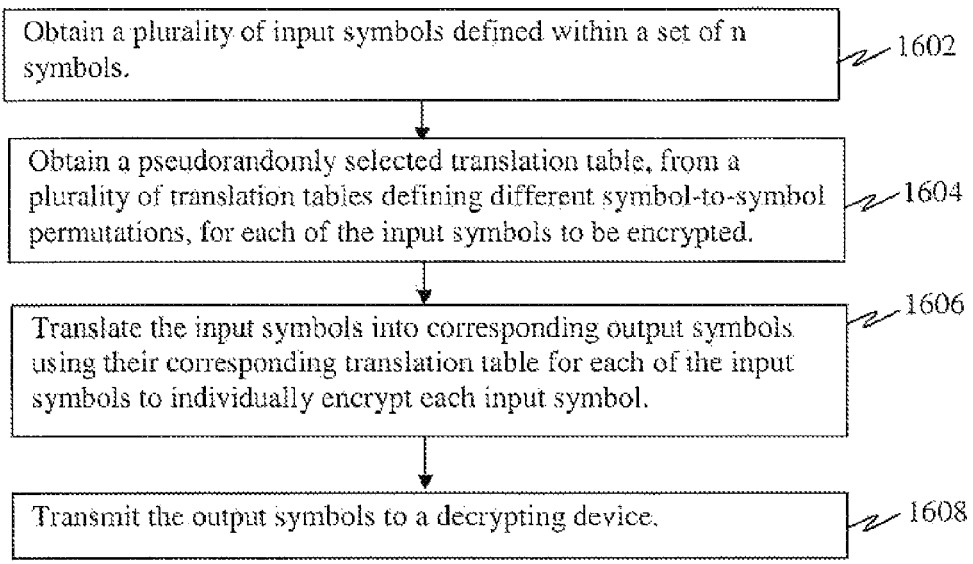
FIG. 16 illustrates a method for performing plaintext encryption according to one example.

FIG. 16 illustrates a method for performing plaintext encryption according to one example. A plurality of input symbols defined within a set of n symbols is obtained 1602. A pseudorandomly selected translation table, from a plurality of translation tables defining different symbol-to-symbol permutations, is obtained for each of the input symbols to be encrypted 1604. The input symbols are translated into corresponding output symbols using their corresponding translation table for each of the input symbols to individually encrypt each input symbol 1606. The output symbols may then be transmitted to a decrypting device 1608.

In one example of such method a first plaintext symbol is obtained, wherein the first plaintext symbol may be one of n symbols in a set. A first translation table is obtained that translates n symbols into a different permutation of the n symbols. The first translation table may be pseudorandomly generated by using a pseudorandom number to shuffle the n symbols. The first plaintext symbol is then translated into a first output symbol using the first translation table.

A second translation table may be obtained that translates n symbols into a different permutation of the n symbols than the first translation table. The first output symbol is translated into a second output symbol using the second translation table. An encrypted symbol is then transmitted based on the first and/or second output symbols.

Figure 17:
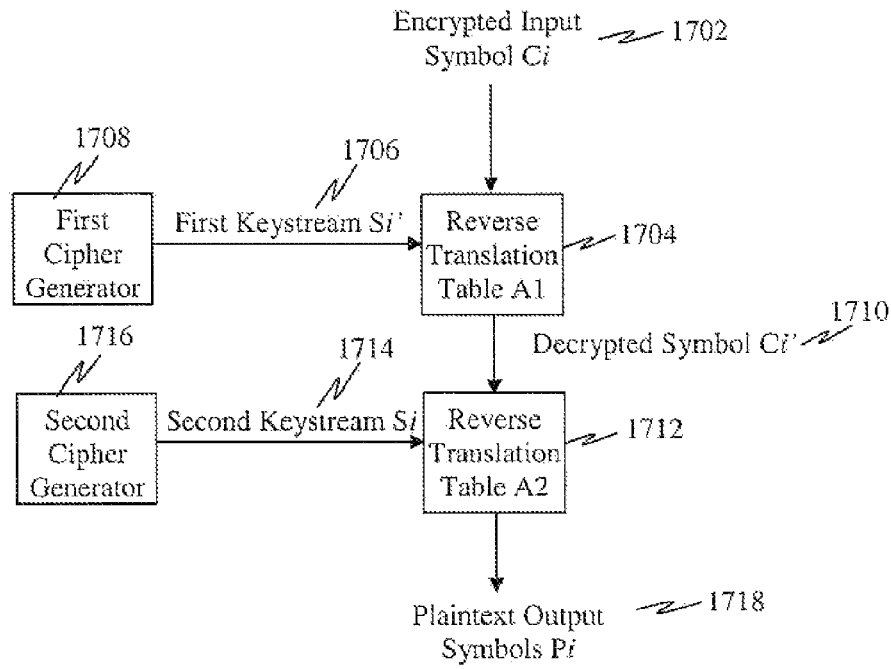
FIG. 17 is a block diagram illustrating how encrypted symbols may be decrypted by using one or more reverse translation tables to obtain a single plaintext symbol.

FIG. 17 is a block diagram illustrating how encrypted symbols Ci may be decrypted by using one or more reverse translation tables to obtain a single plaintext symbol. That is, an encrypted input symbol Ci 1702 may be decrypted by a first reverse translation table A1 1704, that may be generated or selected based on a first keystream Si' 1706 obtained from a first cipher generator 1708, to obtain a first decrypted output symbol Ci' 1710. The first decrypted output symbol Ci' 1710 then serves as input to a second reverse translation table A2 1712, that may be generated or selected based on a second keystream Si 1714 obtained from a second cipher generator 1716, used to obtain a plaintext output symbol Pi 1718.

In alternative configurations, where Ci=(x,y) for example, encrypted symbols x and y may be decrypted in the reverse order in which they were encrypted to obtain the plaintext output symbol Pi.

Figure 18:
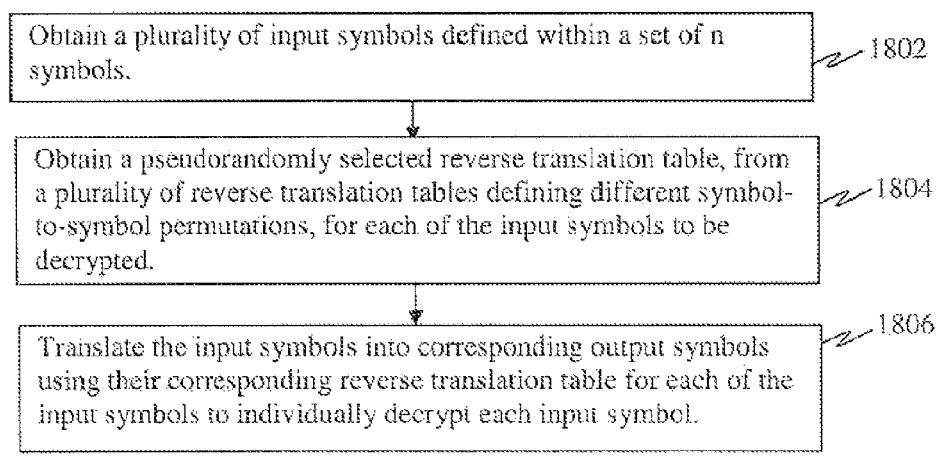
FIG. 18 illustrates a method for performing plaintext encryption according to one example.

FIG. 18 illustrates a method for performing symbol decryption according to one example. A plurality of (encrypted) input symbols defined within a set of n symbols is obtained 1802. A pseudorandomly selected reverse translation table is obtained, from a plurality of reverse translation tables defining different symbol-to-symbol permutations, for each of the input symbols to be decrypted 1804. Translate the input symbols into corresponding output symbols using their corresponding reverse translation table for each of the input symbols to individually decrypt each input symbol 1806.

In one example of such method a first encrypted symbol (input symbol) is obtained, wherein the first encrypted symbol is one of n symbols in a set. A first reverse translation table is also obtained that translates n symbols into a different permutation of the n symbols. The first reverse translation table may be pseudorandomly generated by using a pseudorandom number to shuffle the n symbols. The first encrypted symbol is translated into a first output symbol using the first reverse translation table. A second reverse translation table is obtained that translates n symbols into a different permutation of the n symbols than the first translation table. The first output symbol is translated into a second output symbol using the second reverse translation table. A plaintext symbol may then be obtained based on the first and/or second output symbols.

Figure 19:
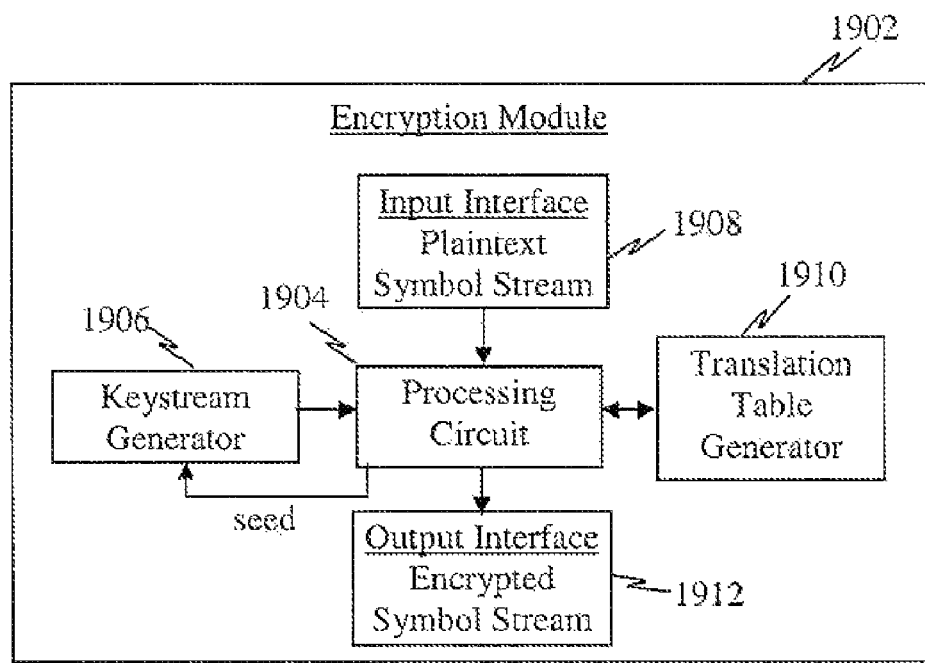
FIG. 19 is a block diagram illustrating an encryption module according to one example.

FIG. 19 is a block diagram illustrating an encryption module according to one example. The encryption module 1902 may be include a processing circuit 1904 configured to provide a seed to a keystream generator 1906. The keystream generator 1906 generates a keystream of pseudorandom numbers or symbols which are sent to the processing circuit 1904. An input interface 1908 coupled to the processing circuit 1904 may receive a plaintext symbol stream. In order to encrypt the plaintext symbol stream, the processing circuit 1904 may be configured to use a pseudorandom number obtained from the keystream to obtain a translation table from a translation table generator 1910. The translation table generator 1910 may be configured to use the pseudorandom number to, for example, shuffle and/or combine symbols of a base table in a pseudorandom, non-biased, manner to provide a translation table. The processing circuit 1904 then uses the translation table once to translate a first plaintext symbol into a first encrypted symbol of an encrypted symbol stream. The encrypted symbol stream may be transmitted through an output interface 1912 coupled to the processing circuit 1904. For each plaintext symbol in the plaintext symbol stream, a different translation table may be generated and used to translate that symbol.

Figure 20:
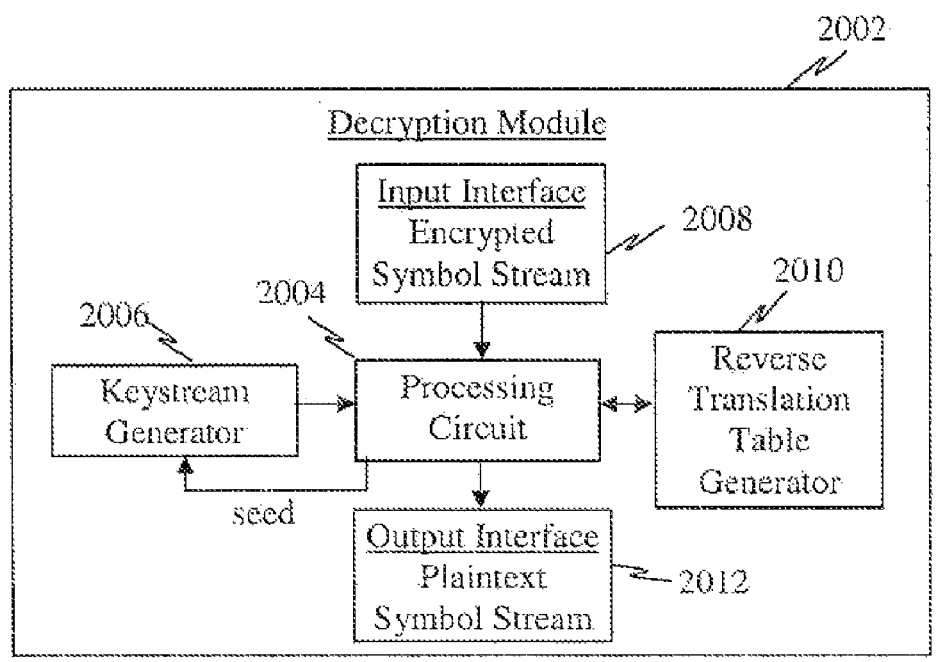
FIG. 20 is a block diagram illustrating a decryption module according to one example.

FIG. 20 is a block diagram illustrating a decryption module according to one example. The decryption module 2002 may be include a processing circuit 2004 configured to provide a seed to a keystream generator 2006. The keystream generator 2006 generates a keystream of pseudorandom numbers or symbols which are sent to the processing circuit 2004. An input interface 2008 coupled to the processing circuit 2004 may receive an encrypted symbol stream. In order to decrypt the encrypted symbol stream, the processing circuit 2004 may be configured to use a pseudorandom number obtained from the keystream to obtain a translation table from a reverse translation table generator 2010. The reverse translation table generator 2010 may be configured to use the pseudorandom number to, for example, shuffle and/or combine symbols of a base table in a pseudorandom, non-biased, manner to provide a translation table. The processing circuit 2004 then uses the reverse translation table once to translate a first encrypted symbol into a first plaintext symbol of a plaintext symbol stream. The plaintext symbol stream may be transmitted through an output interface 2012 coupled to the processing circuit 2004.

In order for air encryption module 1902 and decryption module 2002 to properly encrypt and decrypt a symbol, respectively, they may have the same keystream generator and have complementary translation table generators. In order to synchronize the keystream generators 1906 and 2006, a common seed may be established (e.g., by a secure authentication scheme) for a particular communication session between the encryption module and decryption module. For instance, a session key may be used as the seed for the keystream generators 1906 and 2006.

While some of the examples described herein refer to encryption of DTMF tones, the encryption methods described herein may be implemented with many other types of communication systems to secure transmitted information.

One or more of the components, steps, and/or functions illustrated in FIGS. 1-18 may be rearranged and/or combined into a single component, step, and/or function or in separated into several components, steps, and/or functions without departing from the invention. Additional elements, components, steps, and/or functions may also be added without departing from the invention. The apparatus, devices, and/or components illustrated in FIGS. 1, 2, 3, 5, 7, 9, 13, 17, 19 and/or 20 may be configured to perform one or more of the methods, features, or steps described in FIGS. 2, 4, 6, 8, 10, 11, 12 14, 15, 16 and/or 18.

Those of skill would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing configurations are merely examples and are not to be construed as limiting the invention. The description of these examples is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on an encrypting device for selectively securing symbol transmissions during a telephonic transaction, comprising:
obtaining a plurality of input symbols from a dual tone multi-frequency (DTMF) signal, originating at a telephone device, for the telephonic transaction over a communication path between the telephone device and a destination device;
obtaining a pseudorandomly selected translation table, from a plurality of translation tables defining different symbol-to-symbol permutations, for each of the input symbols to be encrypted;
translating the input symbols into corresponding output symbols using their corresponding translation table for each of the input symbols to individually encrypt each input symbol; and
transmitting the output symbols to the destination device as a dual tone multi-frequency (DTMF) output signal over the communication path.

2. The method of claim 1 wherein obtaining the pseudorandomly selected translation table for each of the input symbols to be encrypted includes obtaining a pseudorandomly selected first translation table for a first input symbol; and
obtaining a pseudorandomly selected second translation table for a second input symbol;
and wherein translating the input symbols into corresponding output symbols using their corresponding translation table for each of the input symbols includes
translating the first input symbol into a first output symbol using the first translation table; and
translating the second input symbol into a second output symbol using the second translation table.

3. A method operational on an encrypting device, comprising:
obtaining a plurality of input symbols;
obtaining a pseudorandomly selected translation table, from a plurality of translation tables defining different symbol-to-symbol permutations, for each of the input symbols to be encrypted; and
translating the input symbols into corresponding output symbols using their corresponding translation table for each of the input symbols to individually encrypt each input symbol, wherein the plurality of input symbols is defined by a set of N symbols, where N is a positive integer and a translation table is a permutation of the N symbols, and the first pseudorandom number is obtained by
generating a pseudorandom number for the first input symbol, where the pseudorandom number is k bits long and k is a positive integer;
determining whether the pseudorandom number is within a maximum number Pmax, where Pmax is the largest multiple of N factorial that is less than a maximum threshold $2^k$;
discarding the pseudorandom number if it is greater than the maximum number Pmax;
obtaining different pseudorandom numbers for the first input symbol until an acceptable pseudorandom number is obtained that is less than or equal to the maximum number Pmax; and
dividing the acceptable pseudorandom number modulo N factorial to obtain the first pseudorandom number.

4. The method of claim 3 wherein obtaining the pseudorandomly selected translation table for each of the input symbols to be encrypted includes
obtaining a first pseudorandom number for a first input symbol to be encrypted; and
shuffling the set of N symbols to obtain a different permutation of the set of N symbols and using that permutation as the translation table for the first input symbol.

5. The method of claim 4 wherein shuffling the set of N symbols includes
initializing a permutation vector P with all symbols of the set of N symbols; and
shuffling the symbols in the permutation vector based on the first pseudorandom number.

6. The method of claim 1 further comprising:
obtaining a second pseudorandomly selected translation table, from the plurality of translation tables defining different symbol-to-symbol permutations, for each of the input symbols to be encrypted; and
translating the output symbols into corresponding second output symbols using their corresponding second translation table for each of the output symbols to further individually encrypt each input symbol.

7. An encryption device for selectively securing symbol transmissions during a telephonic transaction, comprising:
means for obtaining a plurality of input from a dual tone multi-frequency (DTMF) signal, originating at a telephone device, for the telephonic transaction over a communication path between the telephone device and a destination device;
means for obtaining a pseudorandomly selected translation table, from a plurality of translation tables defining different symbol-to-symbol permutations, for each of the input symbols to be encrypted;
means for translating the input symbols into corresponding output symbols using their corresponding translation table for each of the input symbols to individually encrypt each input symbol; and
means for transmitting the output symbols to the destination device as a dual tone multi-frequency (DTMF) output signal over the communication path.

8. The device of claim 7 further comprising:
means for obtaining a pseudorandomly selected first translation table for a first input symbol;
means for obtaining a pseudorandomly selected second translation table for a second input symbol;
means for translating the first input symbol into a first output symbol using the first translation table; and
means for translating the second input symbol into a second output symbol using the second translation table.

9. The device of claim 7 further comprising:
means for obtaining a first pseudorandom number for a first input symbol to be encrypted; and
means for shuffling the set of N symbols to obtain a different permutation of the set of N symbols and using that permutation as the translation table for the first input symbol.

10. The device of claim 9 further comprising:
means for generating a pseudorandom number for the first input symbol, where the pseudorandom number is k bits long and k is a positive integer;
means for determining whether the pseudorandom number is within a maximum number Pmax, where Pmax is the largest multiple of N factorial that is less than a maximum threshold $2^k$;
means for discarding the pseudorandom number if it is greater than the maximum number Pmax;

means for obtaining different pseudorandom numbers for the first input symbol until an acceptable pseudorandom number is obtained that is less than or equal to the maximum number Pmax; and means for dividing the acceptable pseudorandom number modulo N factorial to obtain the first pseudorandom number.

11. The device of claim 7 further comprising:

means for obtaining a second pseudorandomly selected translation table, from the plurality of translation tables defining different symbol-to-symbol permutations, for each of the input symbols to be encrypted; and means for translating the output symbols into corresponding second output symbols using their corresponding second translation table for each of the output symbols to further individually encrypt each input symbol.

12. An encryption device for selectively securing symbol transmissions during a telephonic transaction, comprising:

an input interface for receiving a dual tone multi-frequency (DTMF) signal, originating at a telephone device, the DTMF signal including an input symbol stream for the telephonic transaction over a communication path between the telephone device and a destination device; and a processing circuit coupled to the input interface, the processing circuit configured to obtain a plurality of input symbols from the input interface;

obtain a pseudorandomly selected translation table, from a plurality of translation tables defining different symbol-to-symbol permutations, for each of the input symbols to be encrypted;

translate the input symbols into corresponding output symbols using their corresponding translation table for each of the input symbols to individually encrypt each input symbol; and an output interface coupled to the processing circuit for transmitting the output symbols as a dual tone multi-frequency (DTMF) output signal to the destination device over the communication path.

13. An encryption device comprising:

an input interface for receiving an input symbol stream; and a processing circuit coupled to the input interface, the processing circuit configured to obtain a plurality of input symbols from the input interface;

obtain a pseudorandomly selected translation table, from a plurality of translation tables defining different symbol-to-symbol permutations, for each of the input symbols to be encrypted; and translate the input symbols into corresponding output symbols using their corresponding translation table for each of the input symbols to individually encrypt each input symbol, wherein the plurality of input symbols is defined by a set of N symbols, where N is a positive integer and a translation table is a permutation of the N symbols, and the processing circuit is further configured to generate a pseudorandom number for the first input symbol, wherein the pseudorandom number is k bits long and k is a positive integer;

determine whether the pseudorandom number is within a maximum number Pmax, where Pmax is the largest multiple of N factorial that is less than a maximum threshold $2^k$;

discard the pseudorandom number if it is greater than the maximum number Pmax;

obtain different pseudorandom numbers for the first input symbol until an acceptable pseudorandom number is obtained that is less than or equal to the maximum number Pmax; and divide the acceptable pseudorandom number modulo N factorial to obtain the first pseudorandom number.

14. The device of claim 13 further comprising:

a keystream generator coupled to the processing circuit, the keystream generator configured obtain a first pseudorandom number from the keystream generator for a first input symbol to be encrypted; and a translation table generator coupled to the processing circuit, the translation table generator configured to shuffle the set of N symbols to obtain a different permutation of the set of N symbols and using that permutation as the translation table for the first input symbol.

15. The device of claim 13 wherein the processing circuit is further configured to obtain a second pseudorandomly selected translation table, from the plurality of translation tables defining different symbol-to-symbol permutations, for each of the input symbols to be encrypted; and translate the output symbols into corresponding second output symbols using their corresponding second translation table for each of the output symbols to further individually encrypt each input symbol.

16. A non-transitory machine-readable medium having one or more instructions operational for selectively securing symbol transmissions during a telephonic transaction, which when executed by a processor causes the processor to:

obtain a plurality of input symbols from a dual tone multi-frequency (DTMF) signal, originating at a telephone device, for the telephonic transaction over a communication path between the telephone device and a destination device;

obtain a pseudorandomly selected translation table, from a plurality of translation tables defining different symbol-to-symbol permutations, for each of the input symbols to be encrypted;

translate the input symbols into corresponding output symbols using their corresponding translation table for each of the input symbols to individually encrypt each input symbol; and transmit the output symbols to the destination device as a dual tone multi-frequency (DTMF) output signal over the communication path.

17. The non-transitory machine-readable medium of claim 16 wherein the plurality of input symbols is defined by a set of N symbols, where N is a positive integer and a translation table is a permutation of the N symbols.

18. The non-transitory machine-readable medium of claim 17 having one or more instructions which when executed by a processor causes the processor to further:

obtain a first pseudorandom number for a first input symbol to be encrypted; and shuffle the set of N symbols to obtain a different permutation of the set of N symbols and using that permutation as the translation table for the first input symbol.

19. The non-transitory machine-readable medium of claim 17 having one or more instructions which when executed by a processor causes the processor to further:

generate a pseudorandom number for the first input symbol, wherein the pseudorandom number is k bits long and k is a positive integer, determine whether the pseudorandom number is within a maximum number Pmax, where Pmax is the largest multiple of N factorial that is less than a maximum threshold $2^k$;

discard the pseudorandom number if it is greater than the maximum number Pmax;

obtain different pseudorandom numbers for the first input symbol until an acceptable pseudorandom number is obtained that is less than or equal to the maximum number Pmax; and divide the acceptable pseudorandom number modulo N factorial to obtain the first pseudorandom number.

20. The non-transitory machine-readable medium of claim 16 having one or more instructions which when executed by a processor causes the processor to further:

obtain a second pseudorandomly selected translation table, from the plurality of translation tables defining different symbol-to-symbol permutations, for each of the input symbols to be encrypted; and translate the output symbols into corresponding second output symbols using their corresponding second translation table for each of the output symbols to further individually encrypt each input symbol.

21. A method operational on a decryption device for decrypting symbols, comprising:

obtaining a dual tone multi-frequency (DTMF) signal, originating at a telephone device, for a telephonic transaction over a communication path between the telephone device and a destination device, the DTMF signal including a plurality of input symbols defined within a set of n symbols;

obtaining a pseudorandomly selected reverse translation table, from a plurality of reverse translation tables defining different symbol-to-symbol permutations, for each of the input symbols to be decrypted; and translating the input symbols into corresponding output symbols using their corresponding reverse translation table for each of the input symbols to individually decrypt each input symbol.

22. The method of claim 21 wherein the plurality of input symbols is defined by a set of N symbols, where N is a positive integer and a reverse translation table is a permutation of the N symbols and further comprising:

obtaining a first pseudorandom number for a first input symbol to be decrypted; and shuffling the set of N symbols to obtain a different permutation of the set of N symbols and using that permutation as the reverse translation table for the first input symbol.

23. A method operational on a decryption device for decrypting symbols, comprising:

obtaining a plurality of input symbols defined within a set of n symbols;

obtaining a pseudorandomly selected reverse translation table, from a plurality of reverse translation tables defining different symbol-to-symbol permutations, for each of the input symbols to be decrypted; and translating the input symbols into corresponding output symbols using their corresponding reverse translation table for each of the input symbols to individually decrypt each input symbol, wherein the plurality of input symbols is defined by a set of N symbols, where N is a positive integer and a reverse translation table is a permutation of the N symbols, and the first pseudorandom number is obtained by generating a pseudorandom number for the first input symbol, wherein the pseudorandom number is k bits long and k is a positive integer;

determining whether the pseudorandom number is within a maximum number Pmax, where Pmax is the largest multiple of N factorial that is less than a maximum threshold $2^k$;

discarding the pseudorandom number if it is greater than the maximum number Pmax;

obtaining different pseudorandom numbers for the first input symbol until an acceptable pseudorandom number is obtained that is less than or equal to the maximum number Pmax; and dividing the acceptable pseudorandom number modulo N factorial to obtain the first pseudorandom number.

24. The method of claim 21 further comprising:

obtaining a second pseudorandomly selected reverse translation table, from the plurality of reverse translation tables defining different symbol-to-symbol permutations, for each of the input symbols to be decrypted; and translating the output symbols into corresponding second output symbols using their corresponding second reverse translation table for each of the output symbols to further individually decrypt each input symbol.

25. A decryption device, comprising:

means for obtaining a dual tone multi-frequency (DTMF) signal, originating at a telephone device, for a telephonic transaction over a communication path between the telephone device and a destination device, the DTMF signal including a plurality of input symbols defined within a set of n symbols;

means for obtaining a pseudorandomly selected reverse translation table, from a plurality of reverse translation tables defining different symbol-to-symbol permutations, for each of the input symbols to be decrypted; and means for translating the input symbols into corresponding output symbols using their corresponding reverse translation table for each of the input symbols to individually decrypt each input symbol.

26. The device of claim 25 wherein the plurality of input symbols is defined by a set of N symbols, where N is a positive integer and a reverse translation table is a permutation of the N symbols and further comprising:

means for obtaining a first pseudorandom number for a first input symbol to be decrypted; and means for shuffling the set of N symbols to obtain a different permutation of the set of N symbols and using that permutation as the reverse translation table for the first input symbol.

27. The device of claim 26 wherein the first pseudorandom number is obtained by means for generating a pseudorandom number for the first input symbol, wherein the pseudorandom number is k bits long and k is a positive integer;

means for determining whether the pseudorandom number is within a maximum number Pmax, where Pmax is the largest multiple of N factorial that is less than a maximum threshold $2^k$;

means for discarding the pseudorandom number if it is greater than the maximum number Pmax;

means for obtaining different pseudorandom numbers for the first input symbol until an acceptable pseudorandom number is obtained that is less than or equal to the maximum number Pmax; and means for dividing the acceptable pseudorandom number modulo N factorial to obtain the first pseudorandom number.

28. The device of claim 25 further comprising:

means for obtaining a second pseudorandomly selected reverse translation table, from the plurality of reverse translation tables defining different symbol-to-symbol permutations, for each of the input symbols to be decrypted; and means for translating the output symbols into corresponding second output symbols using their corresponding second reverse translation table for each of the output symbols to further individually decrypt each input symbol.

29. A decryption device, comprising:

an input interface for receiving a dual tone multi-frequency (DTMF) signal, originating at a telephone device, for a telephonic transaction over a communication path between the telephone device and a destination device, the DTMF signal including an input symbol stream; and a processing circuit coupled to the input interface, the processing circuit configured to obtain a plurality of input symbols defined within a set of n symbols;

obtain a pseudorandomly selected reverse translation table, from a plurality of reverse translation tables defining different symbol-to-symbol permutations, for each of the input symbols to be decrypted; and translate the input symbols into corresponding output symbols using their corresponding reverse translation table for each of the input symbols to individually decrypt each input symbol.

30. The device of claim 29 wherein the plurality of input symbols is defined by a set of N symbols, where N is a positive integer and a reverse translation table is a permutation of the N symbols and further comprising:

a keystream generator coupled to the processing circuit, the keystream generator configured obtain a first pseudorandom number from the keystream generator for a first input symbol to be decrypted; and a reverse translation table generator coupled to the processing circuit, the reverse translation table generator configured to shuffle the set of N symbols to obtain a different permutation of the set of N symbols and using that permutation as the reverse translation table for the first input symbol.

31. A decryption device, comprising:

an input interface for receiving an input symbol stream; and a processing circuit coupled to the input interface, the processing circuit configured to obtain a plurality of input symbols defined within a set of n symbols;

obtain a pseudorandomly selected reverse translation table, from a plurality of reverse translation tables defining different symbol-to-symbol permutations, for each of the input symbols to be decrypted; and translate the input symbols into corresponding output symbols using their corresponding reverse translation table for each of the input symbols to individually decrypt each input symbol, wherein the plurality of input symbols is defined by a set of N symbols, where N is a positive integer and a reverse translation table is a permutation of the N symbols and the processing circuit is further configured to generate a pseudorandom number for the first input symbol, wherein the pseudorandom number is k bits long and k is a positive integer;

determine whether the pseudorandom number is within a maximum number Pmax, where Pmax is the largest multiple of N factorial that is less than a maximum threshold $2^k$;

discard the pseudorandom number if it is greater than the maximum number Pmax;

obtain different pseudorandom numbers for the first input symbol until an acceptable pseudorandom number is obtained that is less than or equal to the maximum number Pmax; and divide the acceptable pseudorandom number modulo N factorial to obtain the first pseudorandom number.

32. The device of claim 29 wherein the processing circuit is further configured to obtain a second pseudorandomly selected reverse translation table, from the plurality of reverse translation tables defining different symbol-to-symbol permutations, for each of the input symbols to be decrypted; and translate the output symbols into corresponding second output symbols using their corresponding second reverse translation table for each of the output symbols to further individually decrypt each input symbol.

33. A non-transitory machine-readable medium having one or more instructions for decrypting symbols, which when executed by a processor causes the processor to:

obtain a dual tone multi-frequency (DTMF) signal, originating at a telephone device, for a telephonic transaction over a communication path between the telephone device and a destination device, the DTMF signal including a plurality of input symbols defined within a set of n symbols;

obtain a pseudorandomly selected reverse translation table, from a plurality of reverse translation tables defining different symbol-to-symbol permutations, for each of the input symbols to be decrypted; and translate the input symbols into corresponding output symbols using their corresponding reverse translation table for each of the input symbols to individually decrypt each input symbol.

34. The non-transitory machine-readable medium of claim 33 wherein the plurality of input symbols is defined by a set of N symbols, where N is a positive integer and a reverse translation table is a permutation of the N symbols, and further comprising one or more instructions which when executed by a processor causes the processor to further:

obtain a first pseudorandom number for a first input symbol to be decrypted; and shuffle the set of N symbols to obtain a different permutation of the set of N symbols and using that permutation as the reverse translation table for the first input symbol.

35. The non-transitory machine-readable medium of claim 33 having one or more instructions which when executed by a processor causes the processor to further:

obtain a second pseudorandomly selected reverse translation table, from the plurality of reverse translation tables defining different symbol-to-symbol permutations, for each of the input symbols to be decrypted; and translate the output symbols into corresponding second output symbols using their corresponding second reverse translation table for each of the output symbols to further individually decrypt each input symbol.

36. The method of claim 1, further comprising:

receiving an activation signal over the communication path that causes the encrypting device to switch from an inactive pass-through mode to an active mode where the plurality of input symbols are translated into the corresponding output symbols.

37. The method of claim 36, wherein the activation signal is a unique set of DTMF tones.

38. The method of claim 36, wherein the activation signal is a telephone number dialed from a telephone device and recognized by the encryption device.

39. The method of claim 36, wherein the encryption device is proximate a telephone device that generates the DTMF signal.

40. The method of claim 36, wherein the activation signal is sent by a security server over the communication path upon initiation of the telephonic transaction.

41. The method of claim 1, wherein the plurality of input symbols is a selected subset of symbols from all symbols transmitted from a telephone device for the telephonic transaction.

42. The method of claim 1, wherein the encryption device secures symbols originating at a telephone device being transmitted to a destination device over the communication path, the method further comprising:
- performing an authentication process between the encryption device and destination device;
- establishing a key between the encryption device and destination device which is used to obtain the pseudorandomly selected translation table for each of the input symbols to be encrypted.

43. The method of claim 1, wherein the encryption device draws its power from the communication path.

44. The method of claim 21, further comprising:
- sending an activation signal over the communication path that causes an encrypting device to switch from an inactive pass-through mode to an active mode where original symbols are translated into the plurality of input symbols.

45. The method of claim 44, wherein the activation signal is a unique set of DTMF tones.

46. The method of claim 21, wherein the plurality of input symbols is a selected subset of symbols from all symbols transmitted from the telephone device for the telephonic transaction.

47. The method of claim 21, further comprising:
- performing an authentication process between the decryption device and an encryption device that transmits the plurality of input symbols;
- establishing a key between the encryption device and decryption device which is used to obtain the pseudorandomly selected reverse translation table for each of the input symbols to be decrypted.

* * * * *